(12) United States Patent
Athanasiou et al.

(10) Patent No.: US 6,588,120 B2
(45) Date of Patent: Jul. 8, 2003

(54) METHOD AND APPARATUS FOR ALIGNING A DRUM ASSEMBLY USED IN A VIDEO RECORDING DEVICE

(75) Inventors: George Athanasiou, Burlingame, CA (US); Constantine Athanasiou, South San Francisco, CA (US)

(73) Assignee: Athan Corporation, South San Francisco, CA (US)

( * ) Notice: Subject to any disclaimer, the term of this patent is extended or adjusted under 35 U.S.C. 154(b) by 0 days.

(21) Appl. No.: 09/967,851

(22) Filed: Sep. 28, 2001

(65) Prior Publication Data

US 2002/0069548 A1 Jun. 13, 2002

Related U.S. Application Data

(60) Provisional application No. 60/250,263, filed on Nov. 29, 2000.

(51) Int. Cl.$^7$ ................................................. G01B 5/00
(52) U.S. Cl. ........................... 33/550; 33/543; 33/549
(58) Field of Search .......................... 33/549, 550, 551, 33/553, 554, 555, 543, 626

(56) References Cited

U.S. PATENT DOCUMENTS

| | | | | |
|---|---|---|---|---|
| 3,534,480 A | * | 10/1970 | Webb | 33/543 |
| 3,618,219 A | * | 11/1971 | Kelly | 33/609 |
| 3,854,216 A | * | 12/1974 | Mosher | 33/609 |
| 4,222,173 A | * | 9/1980 | Hall | 33/533 |

OTHER PUBLICATIONS

Sony Digital Videocassette Recorder DVW–A500/500 Maintenance Manual Part 1, 1$^{st}$ Edition (Revised 3).

* cited by examiner

*Primary Examiner*—Diego Gutierrez
*Assistant Examiner*—Tania C. Courson
(74) *Attorney, Agent, or Firm*—Beyer Weaver & Thomas, LLP

(57) ABSTRACT

Methods and apparatuses for aligning the component parts of a drum assembly are disclosed. One aspect of the invention relates to tools for measuring and aligning the component parts of the drum assembly. By way of example, the tools may include indicator tools for measuring the relative position of the component parts, as well as alignment tools for aligning the component parts in accordance with the measurements. Another aspect of the invention relates to methods of measuring and aligning the component parts of the drum assembly. By way of example, some methods may pertain to aligning the upper drum and/or the drum support of the drum assembly.

10 Claims, 24 Drawing Sheets

METHOD AND APPARATUS FOR ALIGNING A DRUM ASSEMBLY USED IN A VIDEO RECORDING DEVICE

CROSS REFERENCE TO RELATED APPLICATION

This application claims the priority of U.S. Provisional No. 60/250,263 filed on Nov. 29, 2000, which is hereby incorporated by reference.

BACKGROUND OF THE INVENTION

The present invention relates to video tape recorders. More particularly, the present invention relates to improved techniques for aligning the component parts of a drum assembly that is used in a video tape recorder.

Video tape recorders that employ rotating record/reproduce head assembly are well known. In such recorders, tape that is used as the recording medium is wrapped partially around a drum assembly that houses the rotating record/reproduce head assembly. In general, the head assembly rotates while the tape is moved (or held stationary) so as to record or reproduce. By way of example, FIG. 1 illustrates a video tape recorder 2 that includes a housing 4 for enclosing the components and circuitry of the video recording devices. As shown in the cut away portion 6, one of the components is a drum assembly 10 having a tape 8 wrapped partially therearound. By way of example, representative video tape recorders utilizing a drum assemblies may include models DVW, DNW, HDW Series manufactured by Sony Corporation.

FIGS. 2A & 2B illustrates an exemplary drum assembly 10. FIG. 2A is a perspective view, of the drum assembly 10, and FIG. 2B is a side elevation view, in cross section, of the drum assembly 10. As shown, the drum assembly 10 includes an upper drum 12, an inner drum or scanner 14, a lower drum 16, a drum support 18, a spindle assembly 20, an upper base 22 and a lower base 24. The inner drum 14, which is disposed inside an opening 26 formed in the upper drum 12, is attached to the spindle assembly 20 via four inner drum screws 28. The inner drum 14, among other things, includes a plurality of record/reproduce heads 15 configured for video recording. The record/reproduce heads 15 are disposed between the upper and lower drums 12, 16. As should be appreciated, the record/reproduce heads 15 are rotated via the spindle assembly 20 to accomplish any recording or reproducing tasks. The inner drum 14, also includes a cavity 32 for allowing a slip ring assembly (not shown) to be positioned therein. Slip ring assemblies carry electrical signals between the rotating heads and other equipment with which the rotating head has relative motion. By way of example, representative slip ring assemblies may be found in co-pending patent application Ser. No. 09/721, 436, which is titled "Slip Ring Assembly For Use In a Video Recorder" and filed on Nov. 22, 2000, and which is herein incorporated by reference.

The lower base 24 is structurally coupled to the upper base 22 and the upper base 22 is structurally coupled to the lower drum 16. The drum support 18 is configured to hold or support the upper drum 12 relative to the lower drum 16. For example, as shown, the drum support 18 includes an upper drum support arm 36 and a lower drum support arm 38 that are attached together via a pair of upper drum support screws 40. Further, the lower drum support arm 38 is attached to a lower surface of the lower drum 16 via a pair of lower drum support screws 42 and the upper drum support arm 36 is attached to an upper surface of the upper drum 12 via a pair of upper drum screws 44. In most cases, the lower drum support arm 38 includes an inner peripheral surface 39, which abuts an outer peripheral surface 13 of the upper drum 12. The inner peripheral surface 39 is typically arranged in an arcuate manner. In order to ensure contact between the lower drum support arm and the upper drum, a leaf spring mechanism 45 for biasing them together may be provided. In addition, the drum support 18 provides a space 30 so as to position a tape (not shown) along the outer periphery of the drum 10 adjacent the recording/reproducing heads 15.

The spindle assembly 20 includes a spindle 46 and a spindle pad 48. The spindle 46 is rotatably coupled to the upper base 22 via a set of bearings 52 and powered by a motor (not shown) housed within the lower base 24. The motor is typically configured to rotate the spindle 46 along an axis 54 at speeds up to 10,000 revolutions per minute (rpm). One end of the spindle pad 48 is attached to the spindle 46 while the opposite end is attached to the inner drum 14. The spindle pad 48 includes a guide post 33 and a mounting flange 50. As shown, the guide post 33 extends into a portion of the cavity 32, and the mounting flange 50 provides a mounting surface for securing the inner drum 14 thereto. Furthermore, the guide post 33 includes a guide hole 34 configured for supporting a slip ring assembly (not shown).

Unfortunately, the design and implementation of the drum assembly leads to problems which may shorten part life and the proper functioning of the video recording device in which it is used. For example, one problem associated with the above assembly is that the component parts (e.g., spindle assembly 20, lower drum 16, upper drum 12) of the drum assembly may become misaligned. As a result of misalignment, excessive vibrations and/or excessive wear may be encountered during rotation of the spindle within the upper and lower drums. In addition, it may be difficult for the heads 15 to record or reproduce.

In view of the foregoing, there are desired improved methods and apparatuses for aligning the component parts of a drum assembly.

SUMMARY OF THE INVENTION

The invention relates, in one embodiment, to an indicator tool for checking the alignment of a component of a drum assembly used in a video recording device. The indicator tool includes a housing. The indicator tool further includes a holding mechanism coupled to the housing and adapted to secure the indicator tool to a second component of the drum assembly. The indicator tool also includes a measuring device coupled to the housing and adapted to measure the eccentricity of the component when the indicator tool is secured to the second component of the drum assembly.

The invention relates, in another embodiment, to an alignment tool for aligning a support structure of a drum assembly used in a video recording device. The alignment tool includes an alignment plate adapted to be secured to a component of the drum assembly. The alignment plate includes a reference surface, which provides a reference position relative to the position of the component of the drum assembly when the alignment plate is secured to the component of the drum assembly. The alignment tool also includes a positioning mechanism coupled to the alignment plate and adapted to adjust the position of the support structure so that the support structure abuts the reference surface of the alignment plate. When the support structure abuts the reference surface, the support structure is placed in the reference position relative to the position of the component.

The invention relates, in another embodiment, to an alignment fixture for aligning a component of a drum assembly used in a video recording device. The alignment fixture allows the drum assembly to be aligned outside of the video recording device. The alignment fixture includes a base configured to receive and support the drum assembly. The alignment fixture further includes a reference system configured to place a portion of the drum assembly in a known position relative to the base. The alignment fixture further includes a positioning system for adjusting the position of the component of the drum assembly relative to the base when the portion of the drum assembly is positioned in the known position.

The invention relates, in another embodiment, to a method of aligning a drum assembly used in a video recording device. The method includes checking the alignment of a first component of the drum assembly relative to an axis of the drum assembly. The method further includes making a determination as to whether the alignment is within a desired limit. The method also includes adjusting the position of the first component relative to the axis when the alignment is not within the desired limit. The adjusting placing the alignment within the desired limits.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Methods and apparatuses for aligning the component parts of a drum assembly are disclosed. One aspect of the invention relates to tools for measuring and aligning the component parts of the drum assembly. By way of example, the tools may include indicator tools for measuring the relative position of the component parts, as well as aligning tools for aligning the component parts in accordance with the measurements. Another aspect of the invention relates to methods of measuring and aligning the component parts of the drum assembly. By way of example, some methods may pertain to aligning the upper drum and/or the drum support.

Embodiments of the invention are discussed below with reference to FIGS. 3–9. However, those skilled in the art will readily appreciate that the detailed description given herein with respect to these figures is for explanatory purposes as the invention extends beyond these limited embodiments.

Figure 3A:
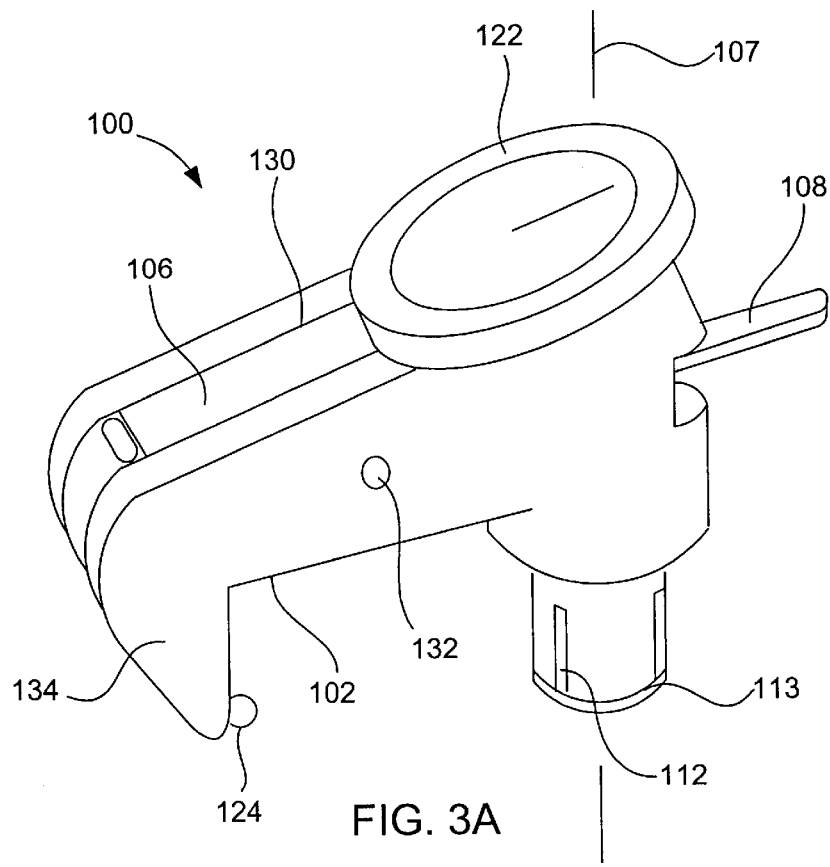
FIG. 3A is a perspective view of an indicator tool, in accordance with one embodiment of the present invention.
Figure 3B:
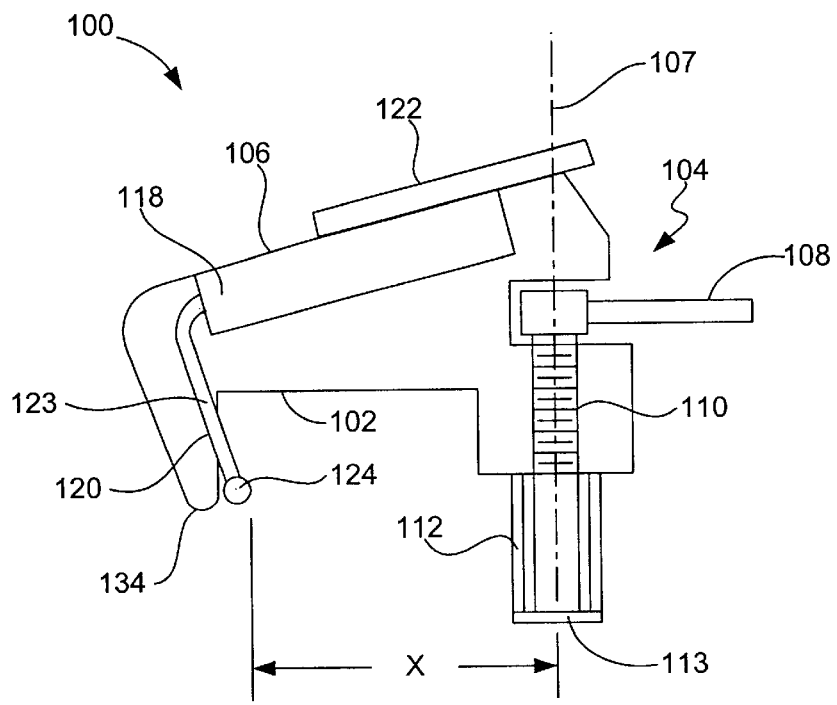
FIG. 3B is a side elevation view, in cross section, of an indicator tool, in accordance with one embodiment of the present invention.

Referring first to FIGS. 3A and 3B, an indicator tool 100 will be described, in accordance with one embodiment of the invention. The indicator tool 100 generally includes a housing 102 for supporting a holding mechanism 104 and a measuring device 106. The holding mechanism 104, which is positioned along an axis 107, is configured to secure the indicator tool 100 to the drum assembly 10. In one embodiment, the holding mechanism 104 is used to secure the indicator tool 100 to a rotatable component of the drum assembly 10 so as to allow the indicator tool 100 to rotate about the spindle axis 54. For example, the holding mechanism 104 may be configured to couple the indicator tool 100 to the spindle assembly 20. When connected to the spindle assembly 20, the indicator tool 100 can swivel around the spindle axis 54 via rotational movement of the spindle pad 48. In most cases, the axis 107 of the holding mechanism 104 is aligned with the spindle axis 54.

Figure 3C:
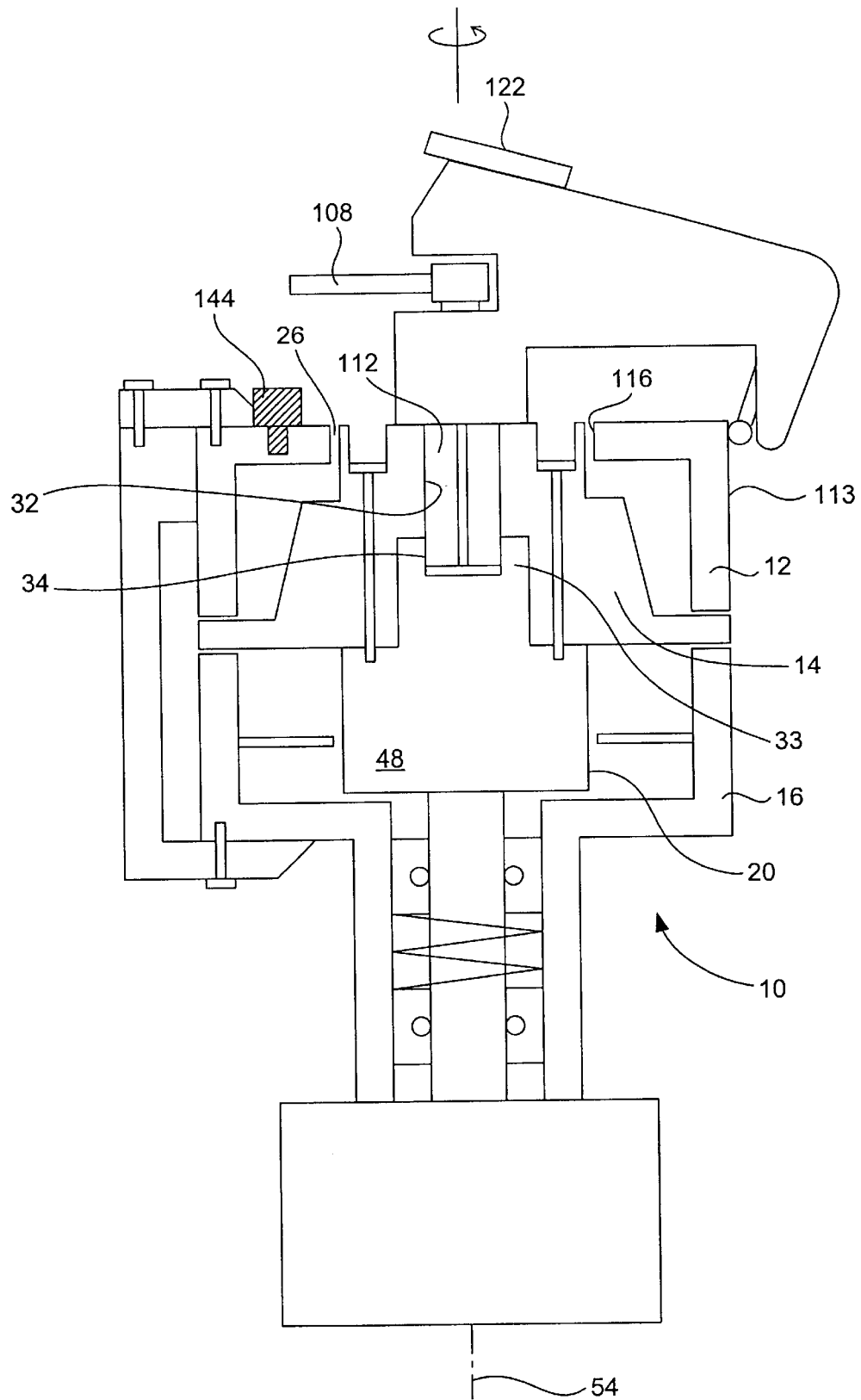
FIG. 3C is a side elevation view, in cross section, showing how an indicator tool is used to measure an upper drum, in accordance with one embodiment of the present invention.

In the illustrated embodiment, the holding mechanism 104 is arranged to engage and couple to the guide post 33 of the spindle assembly 20 (as shown in FIG. 3C). As shown, the holding mechanism 104 includes a locking arm 108, a locking rod 110 and a slotted mount 112. The locking arm 108 is coupled to the locking rod 110 and the locking rod 110 is threadably coupled to the housing 102. The locking rod 110 includes a base 113 at one end thereof As shown, the slotted mount 112, which is configured for insertion into the guide 34 of the guide post 33, is mechanically disposed between the base 113 and a bottom surface of the housing 102. In most cases, the outer diameter of the slotted mount 112 coincides with the inner diameter of the guide 34. As should be appreciated, the locking arm 108, when rotated, causes the threaded locking rod 110 to move upwards or downwards (against the housing 102). When moved upwards, the locking rod 110 moves the base 113 against the slotted mount 112 thus causing the slotted mount 112 to bulge outwardly. As a result of the bulging, the slotted mount 112 engages the sides of the guide 34 thus securing the slotted mount 112 to the guide 34. When moved downwards, the locking rod 110, moves the base 113 away from the slotted mount 112 thus causing the slotted mount 112 to retain its shape. As a result of retaining its shape, the slotted mount 112 disengages from the sides of the guide 34 thus releasing the slotted mount 112 from the guide 34.

It should be noted that connecting the holding mechanism 104 to the guide 34 is not a limitation, and that the holding mechanism 104 can be connected to any component that is rotatable about the spindle axis 54. By way of example, the holding mechanism can also be connected to the spindle 46, other portions of the guide post 33, the flange 50 or the inner drum 14. It should also be noted that the holding mechanism configuration shown herein is not a limitation and that the connecting means may vary according to the specific needs of each device. For example, the housing 102 can be connected to the top surface of the inner drum 14 or flange 50 via screws. It should also be noted that connecting the indicator tool to a rotatable portion of the drum assembly is not a limitation and that the holding mechanism may be connected to a stationary portion of the drum assembly. For example, the holding assembly may be configured to mount to the drum support.

The measuring device 106 is configured to measure the relative displacement of a surface (e.g., eccentricity) when either the surface or the measuring device is moved (e.g., rotated) relative to the other. In one embodiment, the measuring device 106 is used to measure the alignment or eccentricity of the upper drum 112 relative to the spindle axis 54. In this embodiment, the measuring device 106 measures the relative displacement of the periphery of the upper drum 112 as the indicator tool is swiveled around the spindle axis 54. In another embodiment, the measuring device 106 is used to measure the alignment or eccentricity of the drum support 18 relative to the spindle axis 54. In this embodiment, the measuring device 106 measures the relative displacement of the periphery of the of the drum support 18 as the indicator tool is swiveled around the spindle axis 54.

In the illustrated embodiment, the measuring device 106 is related to a dial indicator and therefore it includes an indicator unit 118, a measuring probe 120 and an output gauge 122. Although not shown, the indicator unit 118 generally houses the inner workings of the measuring device. The measuring probe 120 includes an indicator arm 123 having a contact ball 124. The contact ball 124 is configured for contacting the surface to be measured, as for example, the outer periphery of the upper drum 12 or the inner periphery of the drum support 18. The measuring probe 120 is operatively coupled to the indicator unit 118. For example, the indicator arm 123 may be rotatably attached to the indicator unit 118 via a pivot and adjustably positioned via a spring mechanism. The output gauge 122, which is also operatively coupled to the indicator unit 118, is configured to output the displacement of the surface being measured by the probe 120. By way of example, the output gauge 122 may be a dial or an electronic display (e.g., LCD) showing the relative displacement of the probe 120. In most cases, the output gauge 122 is fixed to the indicator unit 118.

In one embodiment, the ball 124 is configured to contact the outer peripheral surface 13 of the upper drum 12. The ball 124 is generally biased towards the outer peripheral surface 13 of the upper drum 12 by some spring means (not shown) so as to produce readings in a direction that is radially aligned and substantially perpendicular to the spindle axis 54. As such, when the indicator tool 100 is rotated about the axis 54 via the alignment shaft/guide connection, deviations (both in a negative and positive direction) along the periphery of the upper drum 12 can be ascertained relative to the axis 54. As should be appreciated, deviations between the axis 54 and the periphery at different points along the periphery tend to show the amount of upper drum mis-alignment or non-eccentricity. Alternatively, the ball 124 may also be arranged for contacting an inner peripheral surface of the upper drum 12.

In another embodiment, the ball 124 is configured to contact the inner peripheral surface 39 of the drum support 18. For example, the ball 124 may contact the arcing portion of the lower drum support 38 that abuts the upper drum 12. In this embodiment, the ball 124 is generally biased towards the inner peripheral surface 39 of the drum support 18 by some spring means (not shown) so as to produce readings in a direction that is radially aligned and substantially perpendicular to the spindle axis 54. As such, when the indicator tool 100 is rotated about the axis 54 via the alignment shaft/guide connection, deviations (both in a negative and positive direction) along the periphery of the drum support 18 can be ascertained relative to the axis 54. As should be appreciated, deviations between the axis 54 and the periphery at different points along the periphery tend to show the amount of upper drum mis-alignment or non-eccentricity.

To elaborate further, the housing 102 is configured to support the holding mechanism 104 and the measuring device 106 in positions that are relative to one another, for example, a distance X. As shown, the distance X is the distance between the axis 107 of the holding mechanism 104 and the measuring probe 120 (e.g., contact ball 124) of the measuring device 106. In the illustrated embodiment, the housing 102 includes a channel 130 therein for slidably receiving the measuring device 106 and a set screw 132 for securing the measuring device 106 in the channel 130. The set screw 132 may allow the measuring device 106 to be repositioned relative to the axis 117. That is, by loosening the set screw 132 the measuring device 106 may be slid within the channel 130 so as to change the distance X. In one implementation, the distance X is adjusted to allow proper contact between the measuring probe and the periphery (e.g., 13) of the upper drum 12. For example, the distance X may correspond to the radius of the upper drum 12. In another implementation, the distance X is adjusted to allow proper contact between the measuring probe 120 and the periphery (e.g., 39) of the drum support 18. The set screw 132 may also allow the measuring device 106 to be removed from the housing 102.

In one implementation, the housing may include a nose 134 for protecting the probe 120 of the measuring device 106 from external forces that may damage these sensitive components. It should be noted, however, that this is not a requirement and that in some cases, it may be necessary to omit the nose 134 from the housing 102 (e.g., when measuring the drum support).

Figure 3D:
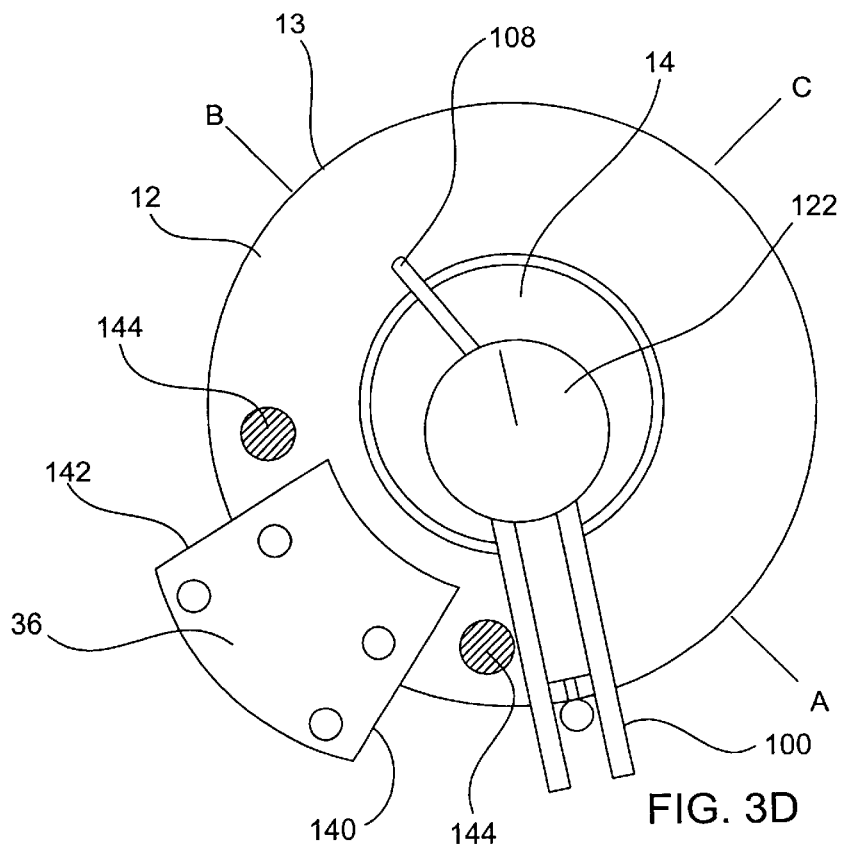
FIG. 3D is a top view showing how an indicator tool is used to measure an upper drum, in accordance with one embodiment of the invention.

FIG. 3C is a side elevation view, in cross section, and FIG. 3D is a top view, showing the indicator tool 100 measuring the outer peripheral surface 13 of the upper drum 12, in accordance with one embodiment of the invention. As shown, the indicator tool 100 is coupled to the spindle assembly 20 through the opening 32 in the inner drum 14 so that it may rotate about the spindle axis 54. In particular, the slotted mount 112 is secured inside the guide 34 of the spindle pad 48. This may be accomplished by placing the slotted mount 112 inside the guide 34 and actuating the locking arm 108 so as to cause the slotted mount 112 to bulge inside the guide 34. Furthermore, the measuring probe 120 is positioned adjacent the outer peripheral surface 13 of the upper drum 12. This is generally accomplished by placing the contact ball 124 in contact with the outer peripheral surface 13 of the upper drum 12. In order to determine the eccentricity of the upper drum 12, the indicator tool 100 may be rotated about the spindle axis 54 while the ball 124 measures the positive and negative displacement of the outer peripheral surface 13 relative to the spindle axis 54. In one embodiment, the eccentricity of the upper drum 12 is measured by positioning the indicator tool 100 towards a first side 140 of the drum support 18, thereafter zeroing the output gauge 122 at the first side 140, and thereafter rotating the indicator tool 100 along the outer peripheral surface 114 to a second side 142 of the drum support 18. If the eccentricity is good, then the dial of the output gauge 122 tends to show a small amount of displacement during rotation. If the eccentricity is not good, then the dial of the output gauge 122 tends to show a large amount of displacement during rotation.

Rubber bumpers may be positioned towards the first and second sides 140, 142 to prevent wear. For example, as shown, rubber bumpers 144 may be positioned on a top surface of the upper drum 12 to prevent the indicator tool 100 from running into the drum support 18 during rotation. In one implementation, the rubber bumpers 144 are configured for insertion into pre-existing holes in the top surface of the upper drum 12. In most cases, the rubber stoppers 144 are placed in holes closest to the drum support 18.

Figure 3F:
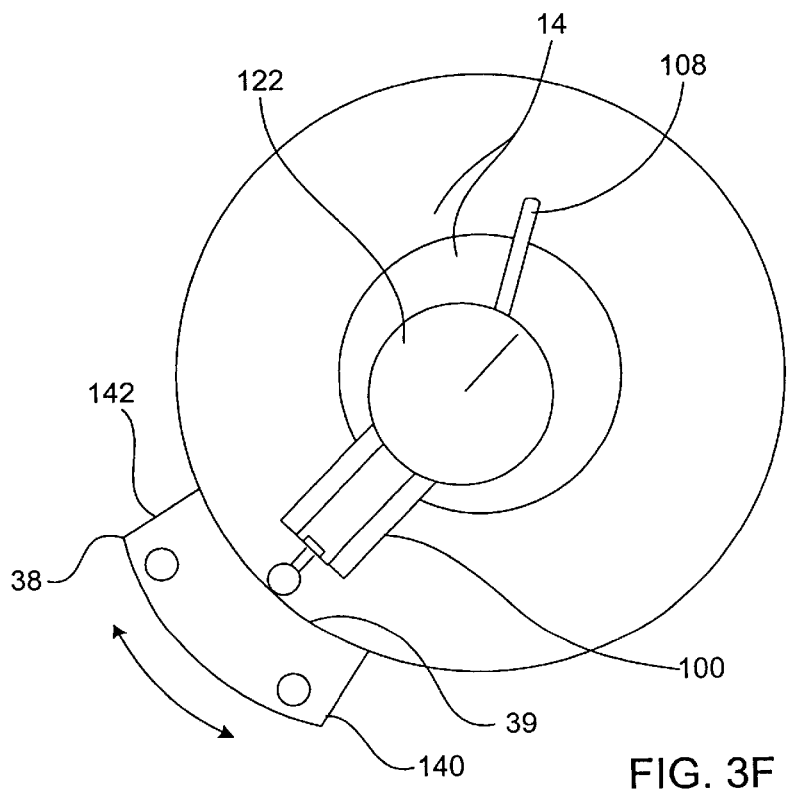
FIG. 3F is a top view, showing how an indicator tool is used to measure a drum support, in accordance with one embodiment of the invention.
Figure 3E:
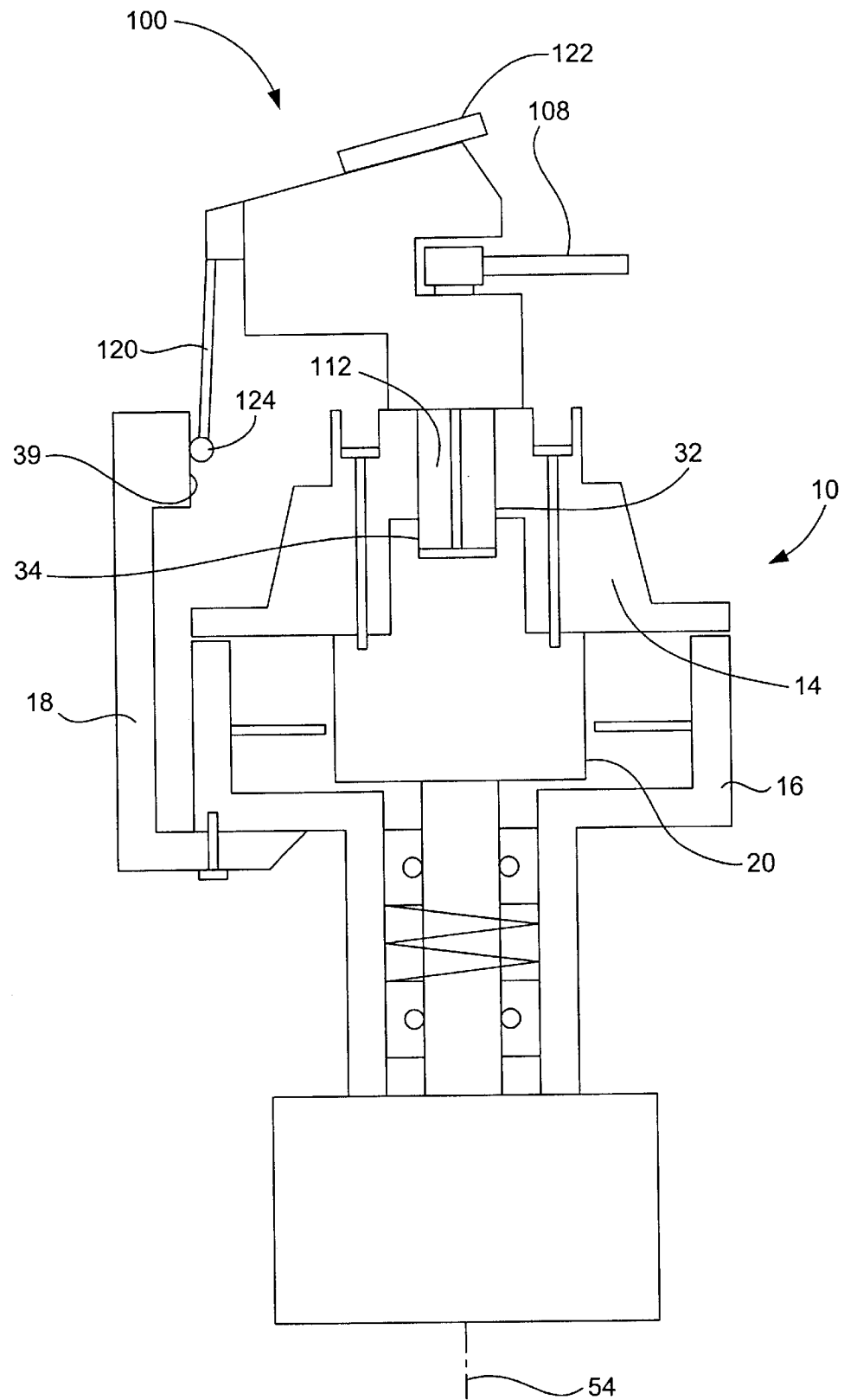
FIG. 3E is a side elevation view, in cross section, showing how an indicator tool is used to measure a drum support, in accordance with one embodiment of the invention.

FIG. 3E is a side elevation view, in cross section, and FIG. 3F is a top view, showing the indicator tool 100 measuring the inner peripheral surface 39 of the drum support 18, in accordance with one embodiment of the invention. In this embodiment, the indicator tool 100 does not include the nose 134, and the upper drum 12 has been removed from the drum assembly 10. As shown, the indicator tool 100 is coupled to the spindle assembly 20 through the opening 32 in the inner drum 14 so that it may rotate about the spindle axis 54. In particular, the slotted mount 112 is secured inside the guide 34. This may be accomplished by placing the slotted mount 112 inside the guide 34 and actuating the locking arm 108 so as to cause the slotted mount 112 to bulge inside the guide 34. Furthermore, the measuring probe 120 is positioned adjacent the inner peripheral surface 39 (e.g., arc) of the drum support 18. This is generally accomplished by placing the contact ball 124 in contact with the inner peripheral surface 39 of the drum support 18. In order to determine the eccentricity of the arc of the drum support 18, the indicator tool 100 may be rotated about the spindle axis 54 while the ball 124 measures the positive and negative displacement of the inner peripheral surface 39 relative to the spindle axis 54. In one embodiment, the eccentricity of the arc of the drum support 18 is measured by positioning the indicator tool 100 towards the first side 140 of the drum support, thereafter zeroing the output gauge 122 at the first side 140, and thereafter rotating the indicator tool 100 along the inner peripheral surface 39 to the second side 142 of the drum support 18. If the eccentricity is good, then the dial of the output gauge 122 tends to show a small amount of displacement during rotation. If the eccentricity is not good, then the dial of the output gauge 122 tends to show a large amount of displacement during rotation.

Figure 4A:
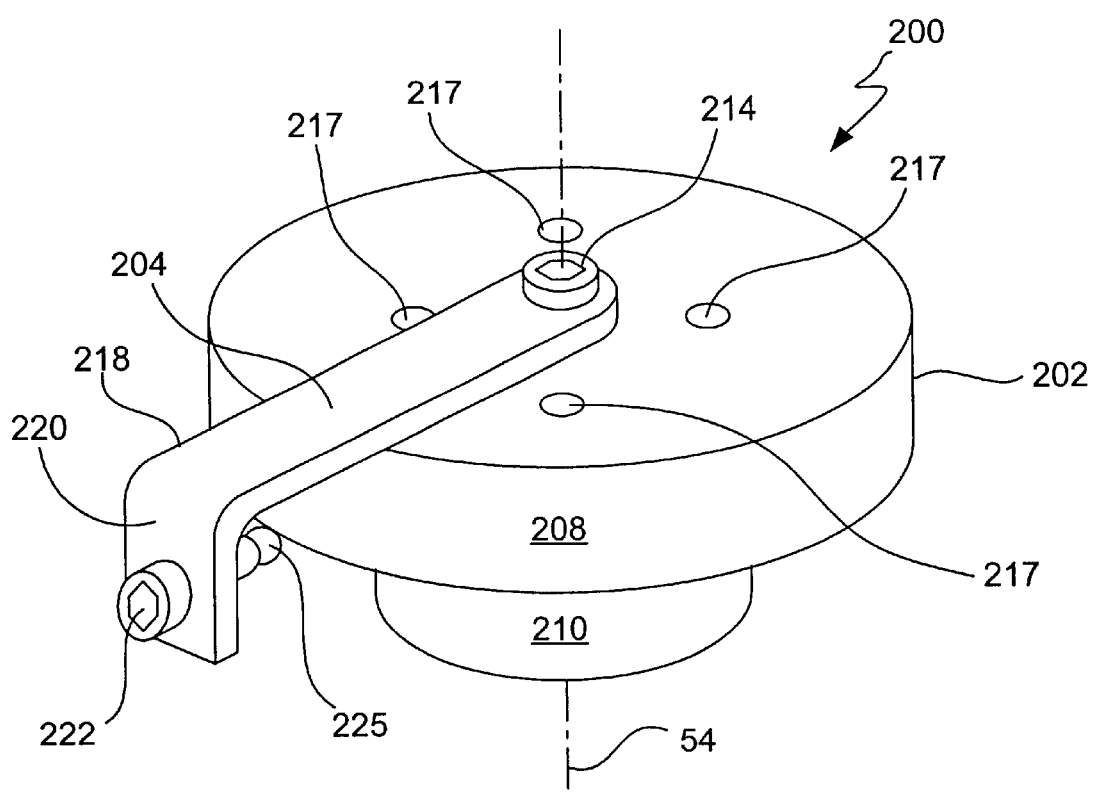
FIG. 4A is a perspective view, of an alignment tool, in accordance with one embodiment of the present invention.
Figure 4B:
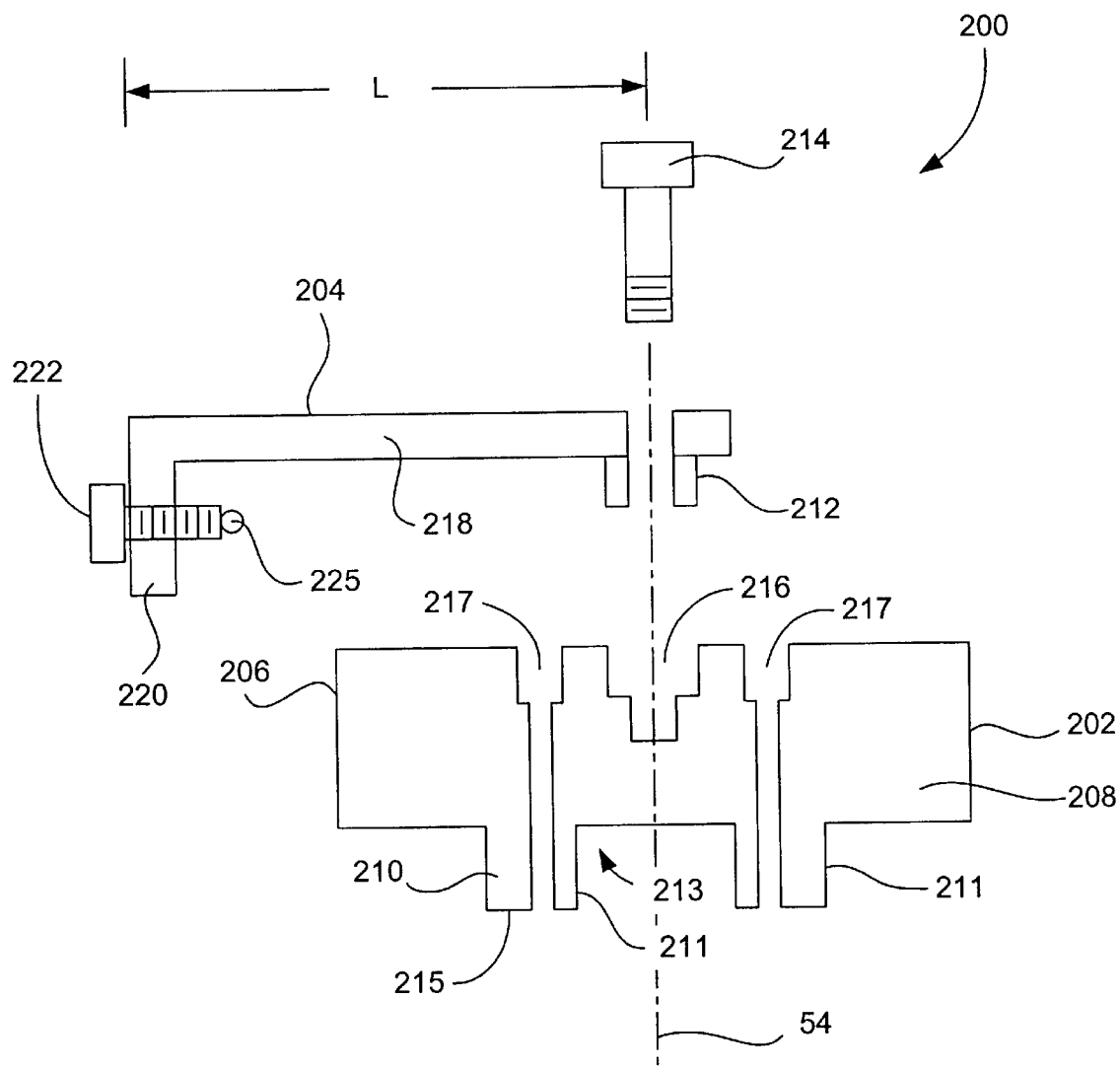
FIG. 4B is a side elevation view, in cross section, of an alignment tool, in accordance with one embodiment of the present invention.

Referring now to FIGS. 4A–B, a drum alignment tool 200 will be described in detail, in accordance with one embodiment of the present invention. The drum alignment tool 200 is arranged to align and position the drum support 18. That is, the alignment tool 200 provides both a reference surface that corresponds to the correct position of the drum support 18 relative to the spindle axis 54, and a biasing means for positioning the drum support 18 in the correct position. In the illustrated embodiment, the alignment tool 200, which is configured to couple to the drum assembly 10, includes an alignment plate 202 and a positioning mechanism 204. The alignment plate 202 is configured to provide a reference surface 206 for correctly positioning the drum support 18 relative to the spindle axis 54. The positioning mechanism 204, on the other hand, is configured to adjust the position of the drum support 18 so that it abuts the reference surface 206 thus placing the drum support 18 in the correct position relative to the spindle axis 54.

To elaborate, the alignment plate 202 includes an upper plate 208 and a lower plate 210. The lower plate 210 is engageable with the spindle assembly 20 of the drum assembly 10. That is, the lower plate 210 includes a wall 211 that defines an opening 213 therein which allows the lower plate 210 to be placed over the guide post 33 of the spindle pad 48, and which allows a bottom surface 215 of the wall 211 to interface with the flange 50 of the spindle pad 48. The upper plate 210 is configured to interface with the drum support 18 (lower drum support 38) during alignment thereof. In one embodiment, the diameter of the upper plate 208 corresponds to the diameter of the upper drum 12. As such, the drum support 38 can be properly positioned by abutting it (e.g., inner surface 39) against the reference surface 206 of the upper plate 208. The alignment plate 202 also includes a plurality of screw holes 217 therethrough. The screw holes 217 are oriented such that the inner drum screws 28 may be used to couple the alignment plate 202 to the spindle assembly 20. When coupled, the alignment plate 202 is substantially aligned with the spindle axis 54. In addition, the alignment tool 200 may rotate via the spindle pad 48.

The positioning mechanism 204 is configured to adjust the position of the drum support 18 relative to the spindle axis 54 when the alignment plate 202 is aligned with the spindle axis 54 and coupled to the spindle assembly 20. In one embodiment, the positioning mechanism 204 is configured for positioning the drum support 18 adjacent the upper plate 208. The positioning mechanism 204 is coupled to the alignment plate 202. In the illustrated embodiment, the positioning mechanism 204 includes an alignment bracket 211 that is detachably coupled to the upper plate 208 via a mounting insert 212 and a mounting screw 214. As shown, the mounting insert 212, which fits into a cavity 216 in the upper plate 208, includes a hole for allowing the mounting screw 214 to be placed therethrough. The mounting screw 214 treadably couples the alignment bracket 218 to the upper plate 208. The threaded connection, as well as, the engagement between the mounting insert 212 and the cavity 216, is preferably located at the center of the upper plate 208 so that the center of the mounting insert 212 is aligned with the spindle axis 54.

When coupled to the upper plate 208, the alignment bracket 218 is configured to place a flange 220 having a biasing screw 222 threadably coupled thereto across from the outer peripheral surface 224 of the upper plate 208. In one embodiment, the alignment bracket has a length L, i.e., the distance between the flange 220 and the threaded connection (e.g., spindle axis 54), that places the flange 220 and thus the biasing screw outside the outer periphery of the drum support 18 when the alignment plate 202 is attached to the spindle assembly 20. The biasing screw 222, which has a contact ball 225 at one end, is configured for applying a force to the drum support 18 so as to move the drum support towards the alignment plate 202. That is, the biasing screw (when rotated) works against the flange 220 to push the drum support 18 towards the upper plate 208 of the alignment plate 202. As such, the drum support 18 can be correctly positioned via the biasing screw 222. The correct position generally corresponds to the condition where the inner peripheral surface 39 of the drum support 18 (e.g., arc) abuts the outer peripheral surface 224 of the upper plate 202.

Figure 4C:
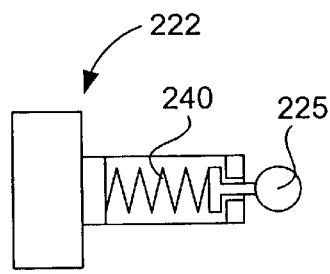
FIG. 4C is a side elevation view, in cross section, of a biasing screw, in accordance with one embodiment of the present invention.

In one embodiment, the biasing screw 222 is arranged to be the give point when a force is applied the drum support 18. Referring to FIG. 4C, the biasing screw 222 may include a spring means 240 for allowing the ball 225 to give in the direction of the applied force. In other embodiments, the biasing screw may have a first turning position for applying the force and a second position for removing the force so as reduce damage caused by excessive turning (a limiter).

Figure 4D:
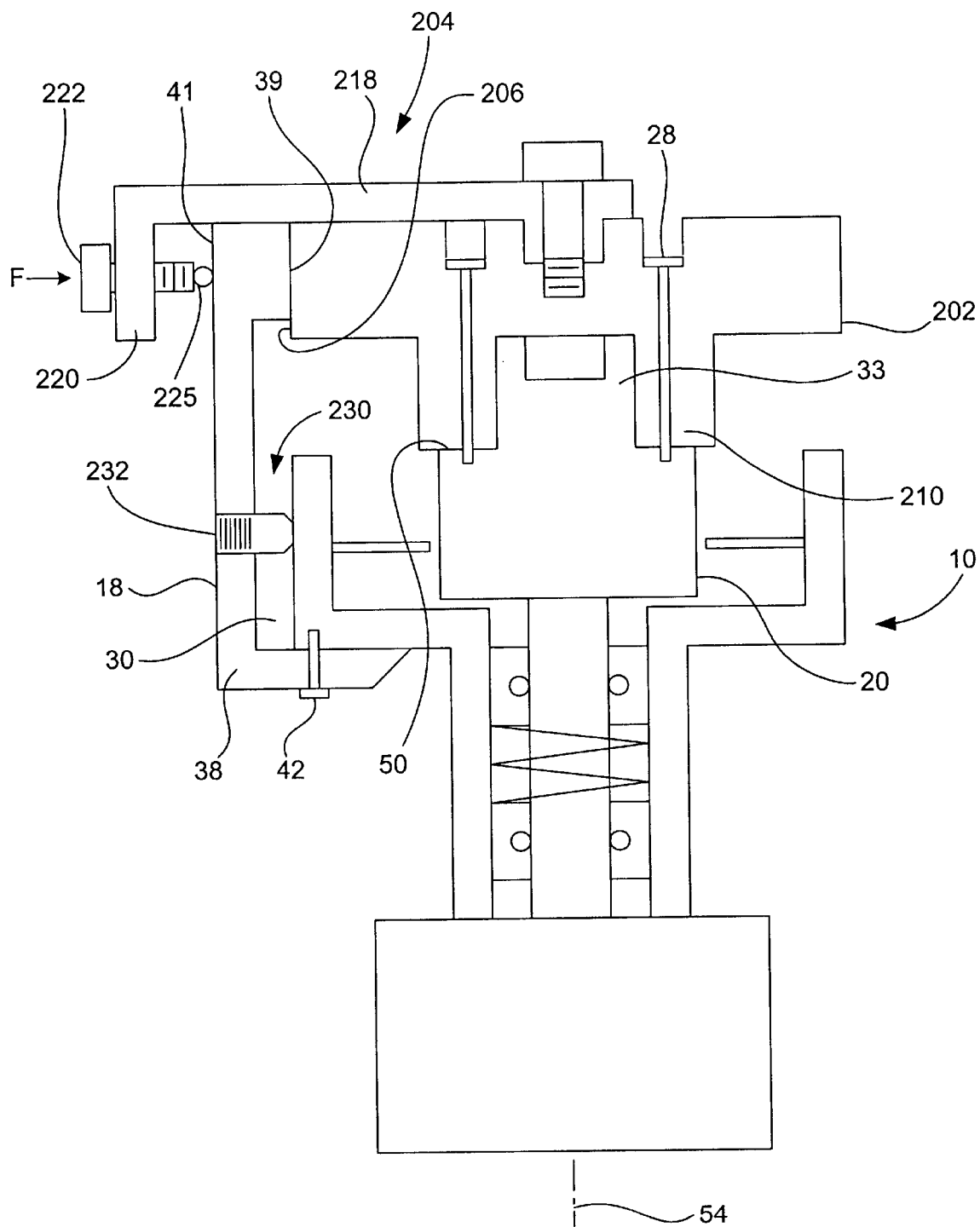
FIG. 4D is a side elevation view showing how an alignment tool is used to align a drum support, in accordance with one embodiment of the present invention.
Figure 4E:
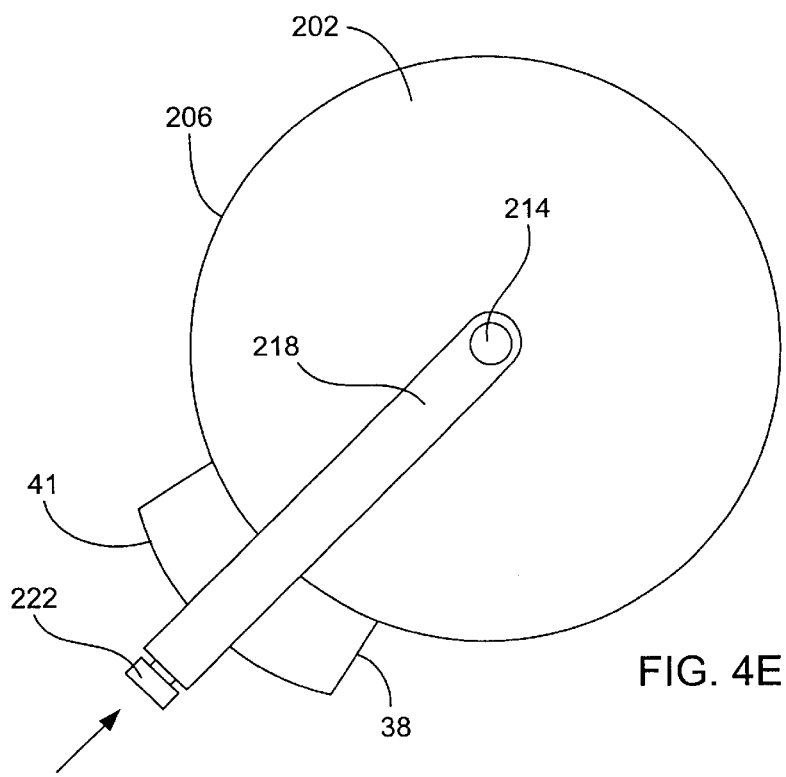
FIG. 4E is a top view showing how an alignment tool is used to align a drum support, in accordance with one embodiment of the present invention.

FIG. 4D is a side elevation view, in cross section, and FIG. 4E is a top view, showing the alignment tool 200 positioning the drum support 18, in accordance with one embodiment of the invention. As shown, the upper drum 12 and inner drum 14 are removed from the drum assembly 10, and the alignment tool 200 is coupled to the spindle assembly 20. In particular, the alignment plate 202 is secured to the spindle pad 48. This may be accomplished by placing the lower plate 210 over the guide post 33 and connecting the screws 28 to the flange 50. Furthermore, the biasing screw 222 is positioned adjacent the outer peripheral surface 41 of the drum support 18. This is generally accomplished by placing the mounting insert 212 in the cavity 216 of the upper plate 208 and connecting the mounting screw 214 to the upper plate 208 so as to couple the alignment bracket 218 to the upper plate 208, and thereafter rotating the flange 220 proximate the drum support 18. Once the flange 220 is proximate the drum support 18, the position of the drum support 18 can be adjusted via the biasing screw 222. This may be accomplished by loosening the lower drum support screws 42, and actuating the biasing screw 222 until the drum support 18 abuts the upper plate 208 of the alignment drum 200. As shown, the positioning mechanism 204 essentially sandwiches the drum support 18 between the biasing screw 222 and the upper plate 208. Once positioned, the lower drum screws 42 may be tightened thus leaving the drum support 18 in the correct position (e.g., aligned).

In an alternate embodiment, the drum assembly 10 can be modified to include a second positioning mechanism so as to move the drum support away from the spindle axis. This may be needed to back the drum support away from the alignment plate. It may also be needed to make adjustments when an alignment plate is not used. Referring to FIG. 4D, for example, a second positioning mechanism 230 is shown. The second positioning mechanism 230 includes a set screw 232 that is threadably coupled to the drum support 18. The set screw 232 is adapted to move through the drum support 18 so as to engage the outer peripheral surface of the lower drum 16. As should be appreciated, the lower drum 16 is fixed, and thus when the set screw 232 engages the lower drum 16, the drum support 18 is pushed away from the spindle axis 54.

Figure 4G:
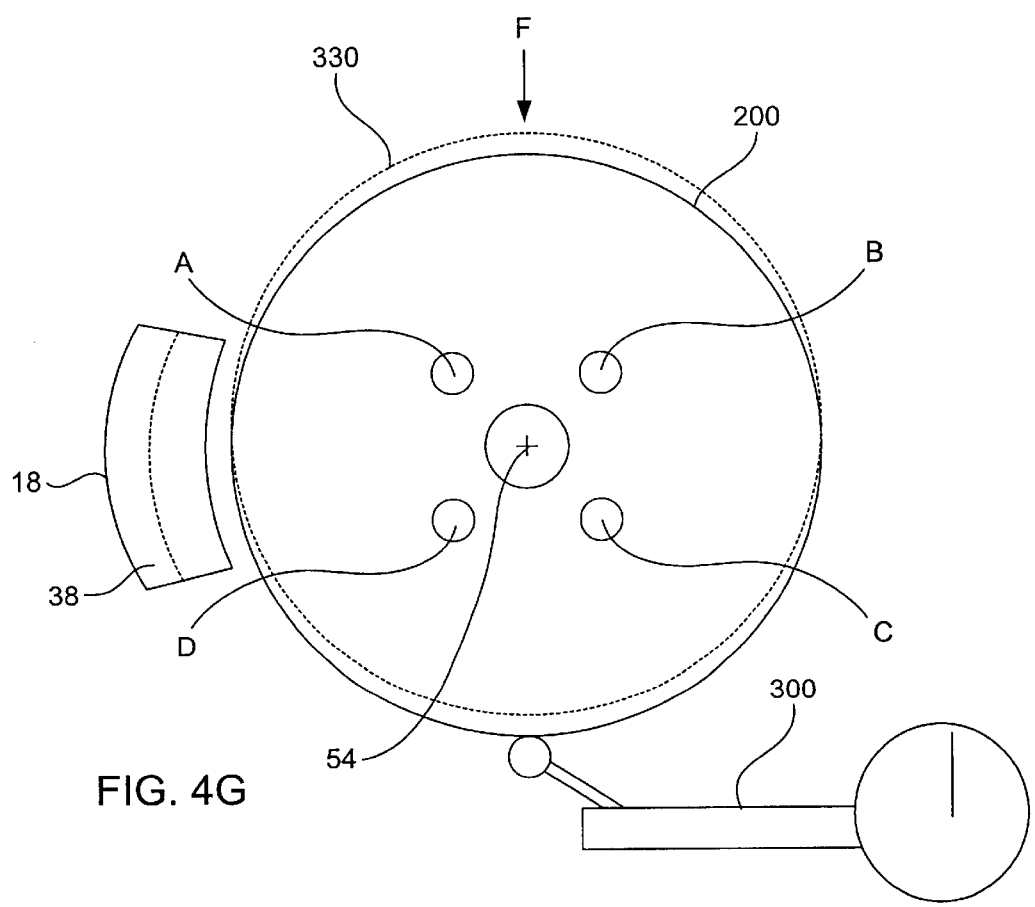
FIG. 4G is a top view showing how an alignment tool is aligned, in accordance with one embodiment of the present invention.
Figure 4F:
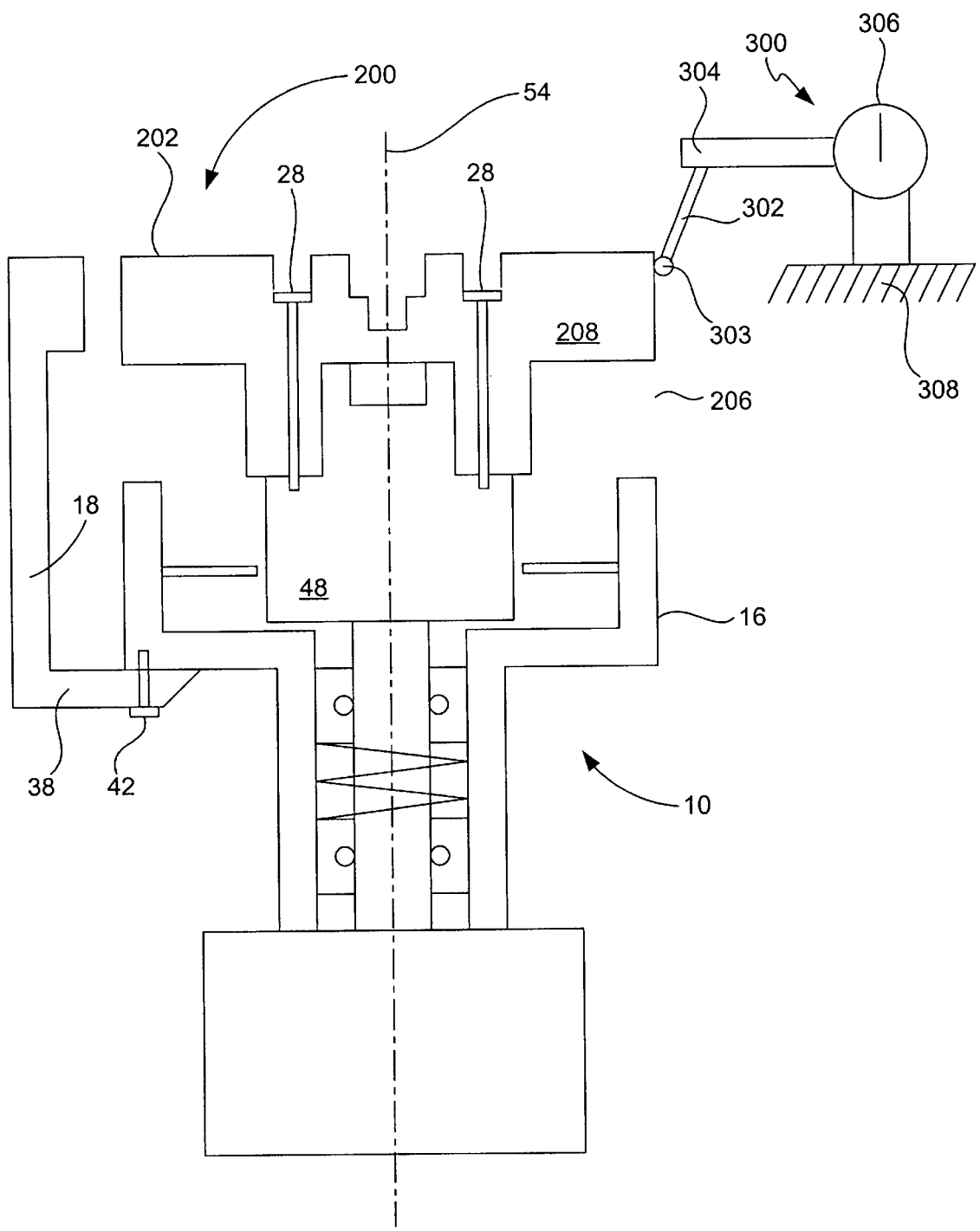
FIG. 4F is a side elevation view showing how an alignment tool is aligned, in accordance with one embodiment of the present invention.

FIG. 4F is a side elevation view, in cross section, and FIG. 4G is a top view, showing how the drum alignment tool 200 is aligned, in accordance with one embodiment of the present invention. This is generally done to ensure the proper positioning of the drum support, i.e., if the eccentricity of the alignment tool is off then the drum support may not be positioned correctly when it abuts the alignment tool. The eccentricity of the alignment tool 200 is generally checked using a measuring device 300. By way of example, the measuring device 300 may be a dial indicator, which is well known to those skilled in the art, or it may be the measuring device 106, which is shown in FIG. 3. As shown, the measuring device 300 includes a measuring probe 302 that includes a ball 303 for contacting the reference surface 206 of the upper plate 208, an indicator unit 304 and a gauge 306 for outputting the measurements. The measuring device 300 is generally connected to a fixed surface 308 during measurements. By way of example, the fixed surface 308 may be the lower drum 16, a grounded surface, a portion of the video recording device 2 or a fixture configured for holding the drum assembly 10 outside the video recorder 2.

The measuring device 300 is typically held in a fixed position. As such, when the alignment tool 200 is rotated about the spindle axis 54, deviations along the periphery of the alignment tool 200 can be ascertained relative to the spindle axis 54. As should be appreciated, deviations between the axis 54 and the periphery tend to show the amount of mis-alignment or non-eccentricity. In one embodiment, a force may applied to the alignment tool, towards the measuring device 300, to adjust its position. As shown in FIG. 4G, for example, when the alignment tool is out of position (shown by dotted lines 330) a force F may be exerted on the alignment tool to move it into the correct position. The force may need to be applied in many iterations. In one implementation, the force F is exerted by a finger. In another implementation, the force F is exerted by a positioning mechanism.

Figure 1:
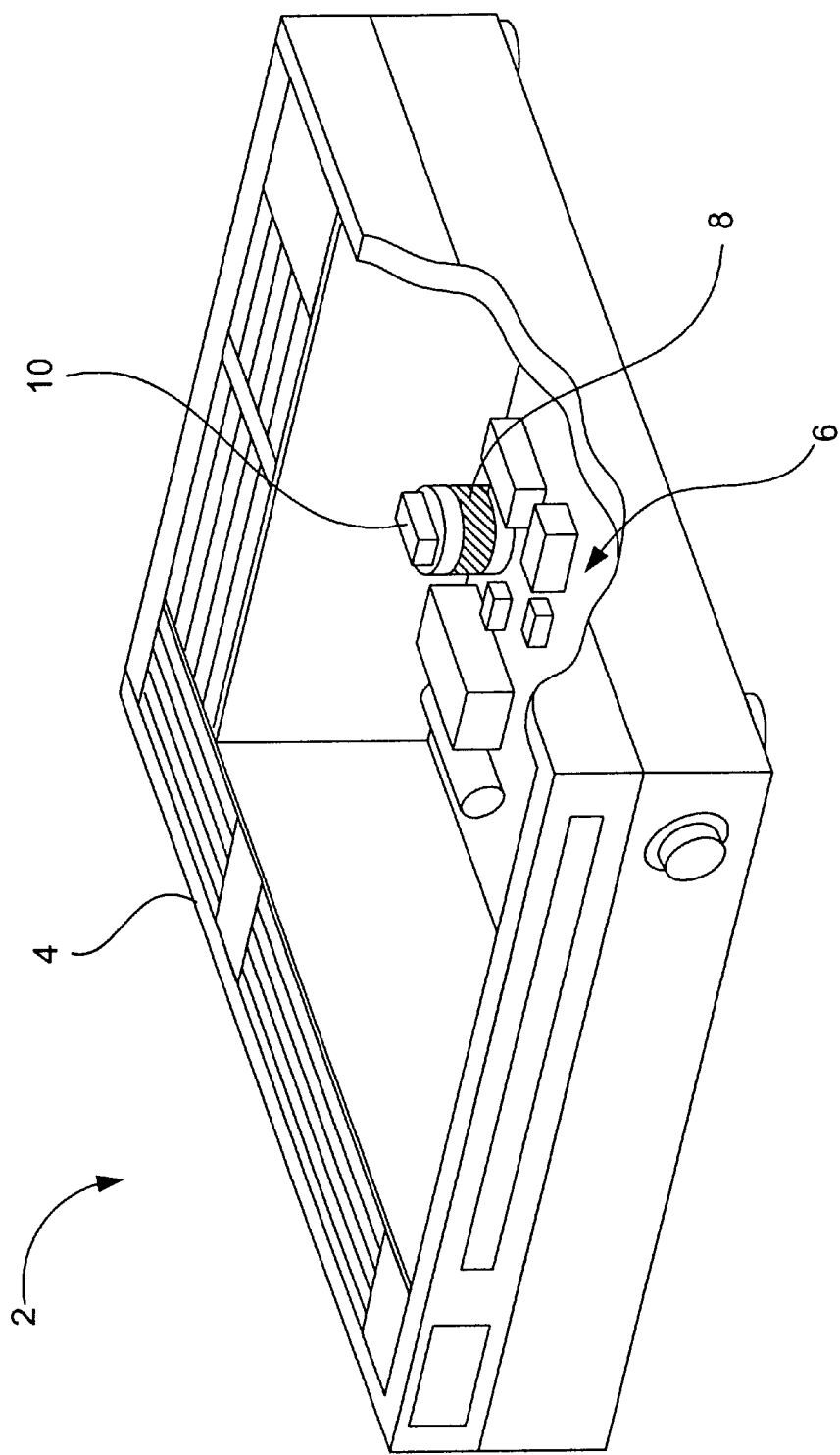
FIG. 1 is a broken away perspective diagram of a video tape recorder.
Figure 2A:
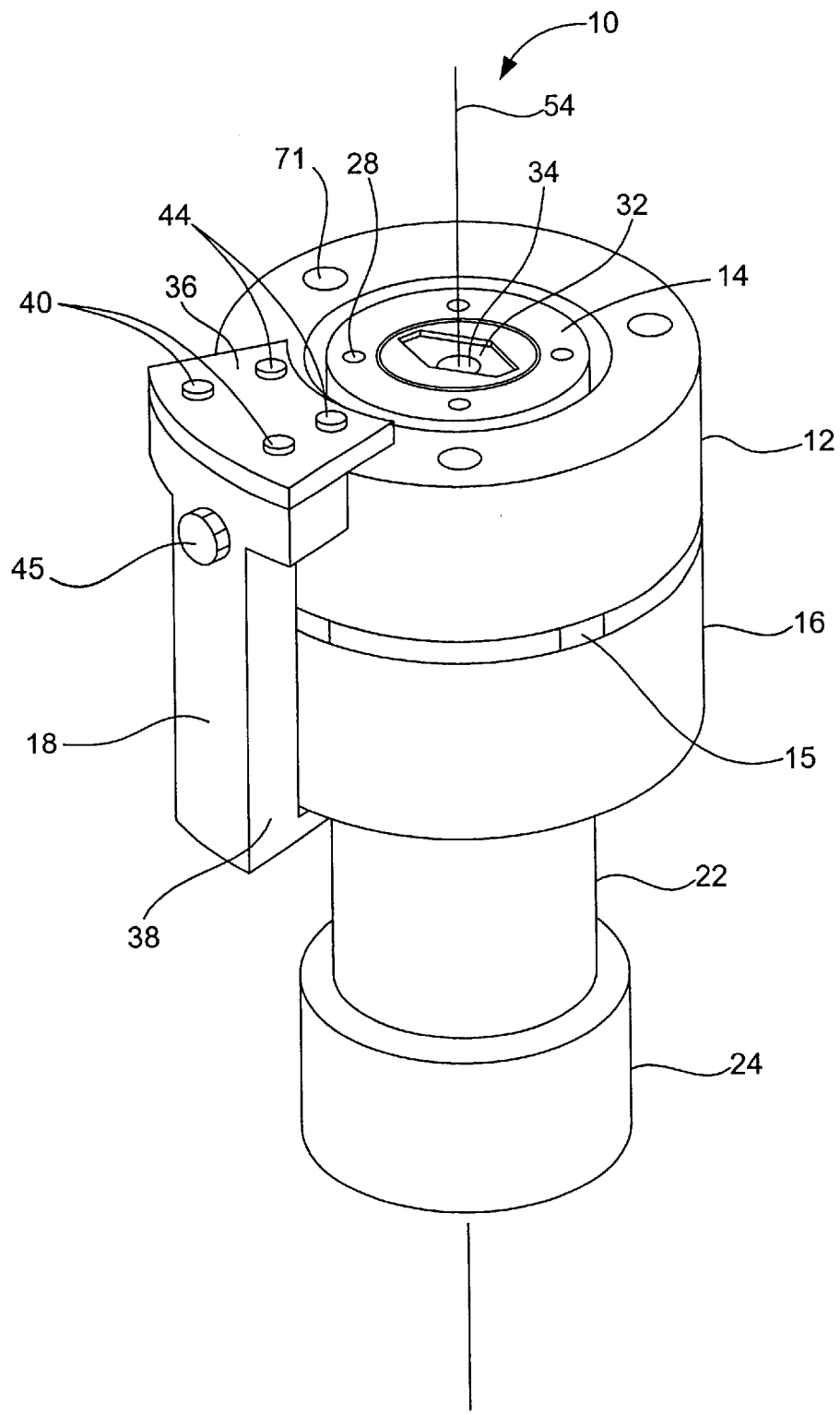
FIG. 2A is a perspective diagram of a drum assembly.
Figure 2B:
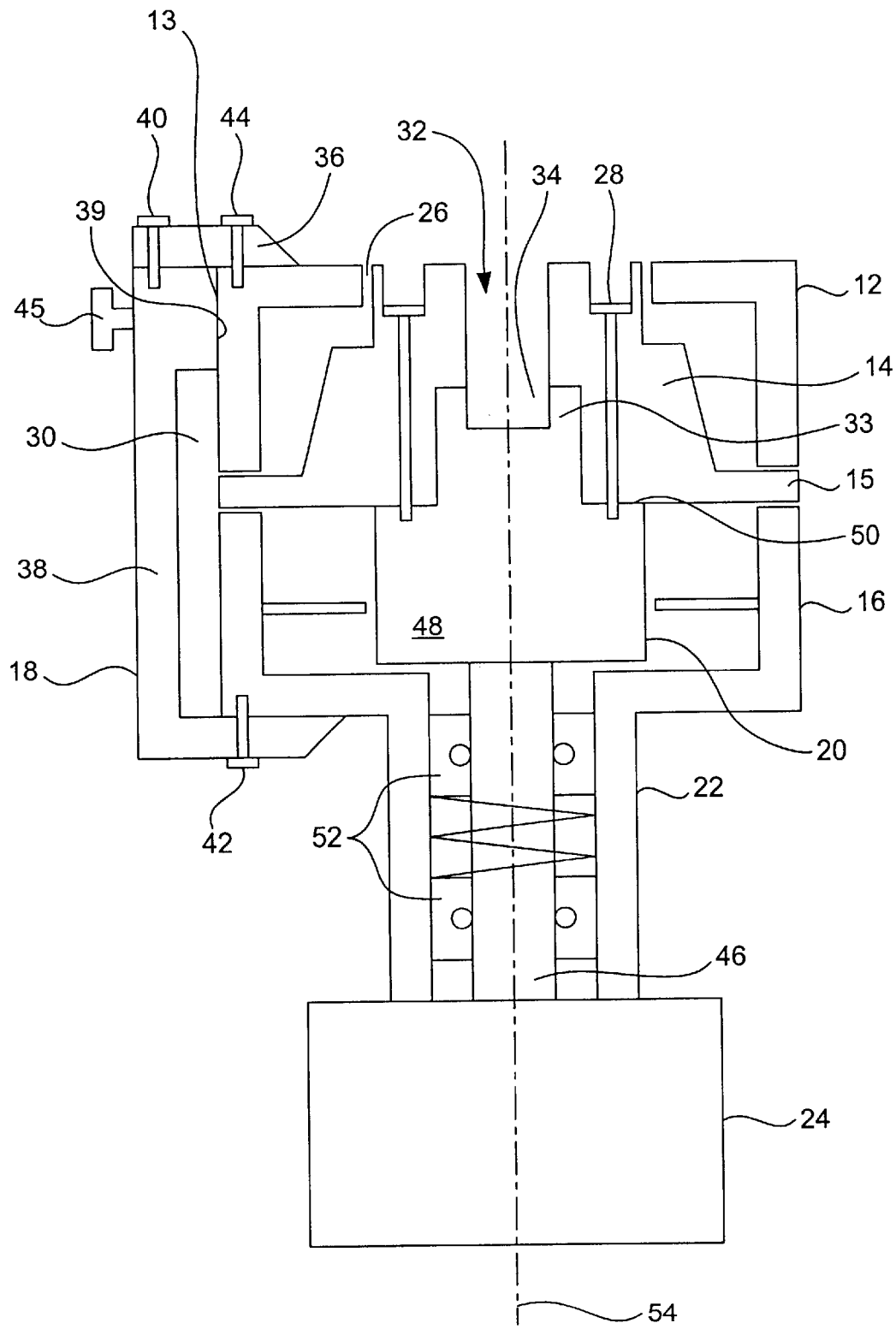
FIG. 2B is a side elevation view, in cross section, of the drum assembly shown in FIG. 2A.
Figure 5:
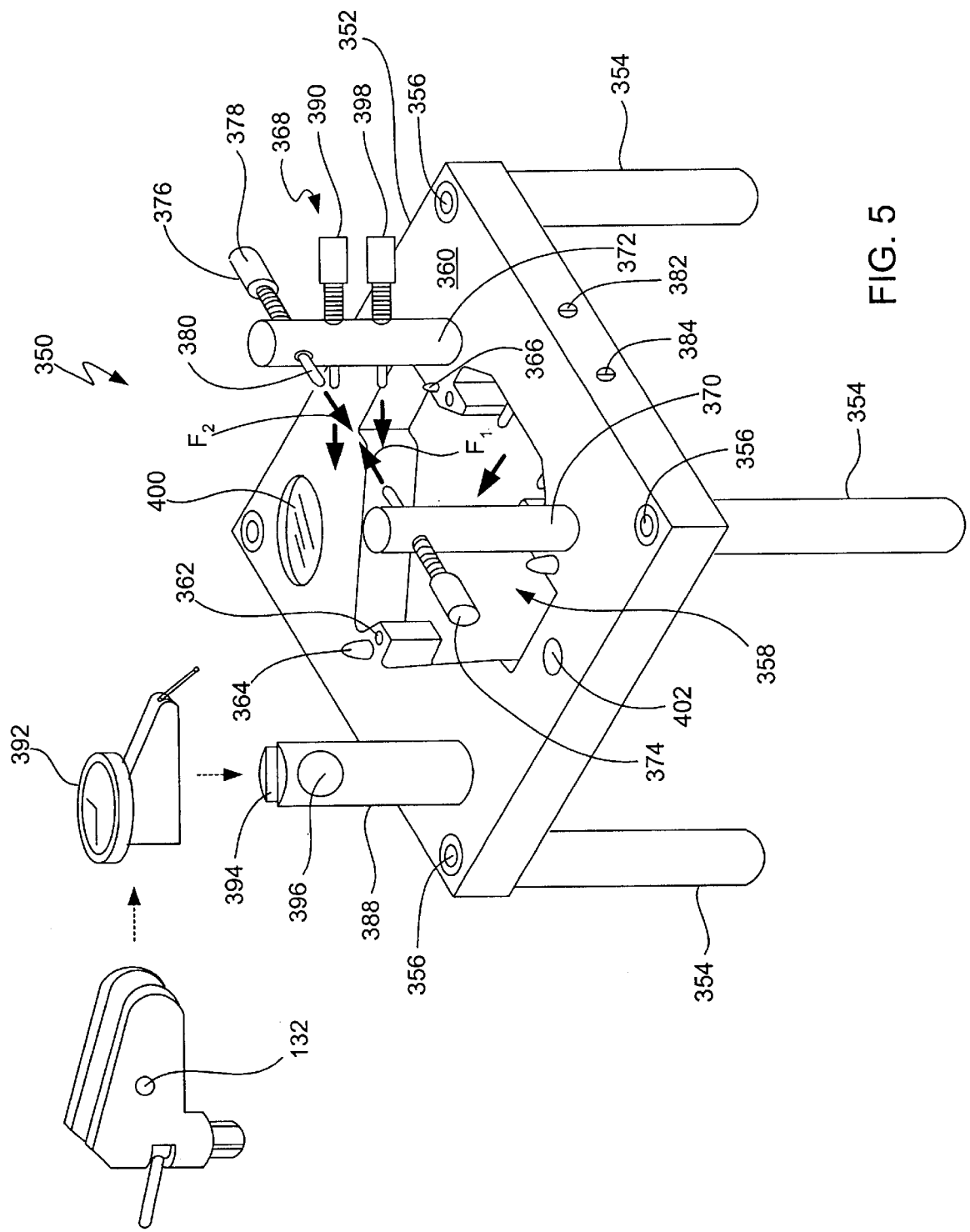
FIG. 5 is a perspective diagram of an alignment fixture, in accordance with one embodiment of the invention.

FIG. 5 is a perspective diagram of an alignment fixture 350, in accordance with one embodiment of the invention. The alignment fixture 350 allows the drum assembly to be aligned outside of the video recorder. The alignment fixture 350 includes a base 352, which is supported by a plurality of legs 354. The legs 354 may be fixed to the base 352 using any suitable means. In the illustrated embodiment, there are four legs that fastened to the corner regions of the base 352 via screws 356. The base 352 includes a drum assembly opening 358 for receiving a portion of the drum assembly 10, and a top surface 360 for supporting the drum assembly 10 therein. In one embodiment, the top surface 360 is configured to support at least a portion of the bottom surface of the lower drum 16. The base 352 may include mounting threads 362 for securing the drum assembly 10 to the base 352 via screws (not shown) placed through the drum assembly 10. For example, referring to FIG. 2A, screws may be placed through holes 71 so as to secure the drum assembly 10 to the base 352.

The alignment fixture 350 also includes reference pins 364 for guiding the drum assembly 10 into the correct position relative to the base 352. The reference pins 364 are generally positioned around the opening 358 so that they each engage and/or abut the side (e.g., outer peripheral surface) of the lower drum 16 when the drum assembly 10 is placed in the opening 358 and on the top surface 360 of the fixture 350. Alternatively or additionally, the base 352 may include an alignment pin 366 for guiding the drum assembly 10 into the correct position relative to the base 352. The alignment pin 366 is generally positioned so that it engages the bottom surface of the lower drum 16 when the drum assembly 10 is placed in the opening 358 and on the top surface 360 of the fixture 350. In one embodiment, the alignment pin 366 extends from the top surface 360 of the base 352 so that it may be inserted into alignment holes (not shown) in the bottom surface of the lower drum 16. By using the reference pins and alignment pins, the drum assembly can be positioned in a known position relative to other components of the fixture. This is advantageous for adjusting the positions of various components of the drum assembly 10 so as to improve eccentricity thereof. In one embodiment, the known position corresponds to the spindle axis 54 of the drum assembly thereby allowing the components of the drum assembly 10 to be positioned relative to the spindle axis.

The fixture 350 also includes a positioning system 368 for adjusting the positions of various components of the drum assembly 10 when the drum assembly 10 is secured to the base. In one embodiment, the positioning system 368 includes a first positioning mechanism for adjusting the position of the upper drum 12. The first positioning mechanism includes a pair of adjustment posts 370 and 372, and a pair of adjustment screws 374 and 376. The adjustment posts 370 and 372 are coupled to the base 352 and extends upwards therefrom. By way of example, the posts may be coupled to the base via screws. The adjustment screws 374 and 376 are threadably coupled to the adjustment posts 370 and 372, respectively. That is, each of the first adjustment posts 370 and 372 includes a thread for receiving a threaded portion of the adjustment screws 374 and 376. As shown, the adjustment screws 374 and 376 may include a tactile feature 378 and an abutment feature 380, which are located at opposite ends of the adjustment screw. The tactile features 378 allow a user to rotate the adjustment screws 374, 376 within the adjustment posts 370, 372, and the abutment feature 380 provides a surface for engaging some portion of the upper drum 12 or some component coupled to the upper drum 12 when the adjustment screws 374, 376 are moved through the adjustment posts 370, 372.

In one embodiment, the adjustment screws 374, 376 when actuated within their respective threads are configured to engage and exert a force F on the upper drum 12 so as to adjust its position. This is generally accomplished when the upper drum support screws 40 have been loosened so as to allow movement of the upper drum 12 relative to the lower drum support 38. Any suitable configuration of the adjustment posts and adjustment screws may be used. In the illustrated embodiment, the adjustment posts 370, 372 are positioned on the base 352 and the adjustment screws 374, 376 are positioned on the posts 370, 372 so that the adjustment screws 374, 376 engage the upper drum support 36, which is coupled to the upper drum 12. The threads of the adjustment posts 370, 372 are generally aligned along the same axis so that the adjustment screws 374, 376 may be placed in an opposed relationship. That is, the first adjustment screw 374 is configured to apply a first force F1 in a first direction, and the second adjustment 376 screw is configured to apply a second force F2 in a second direction, which is opposite the first direction. As such, when the upper drum support screws 40 are loosened, the adjustment screws 374, 376 may be used to reposition the upper drum 12, i.e., the upper drum may be moved back and forth via F1 and F2 until the correct position is obtained.

It should be noted that engaging the upper drum support 36 is not a limitation and that other parts of the upper drum 12 may be engaged. For example, the adjustment screws 374, 376 may be configured to engage the outer peripheral surface 13 of the upper drum 12. In cases such as these, it is generally desirable to have the adjustment screws 374, 376 positioned across one another such that their axis crosses through the center of the spindle axis 54.

In another embodiment, the positioning system 368 includes a second positioning mechanism for adjusting the position of the drum support 18. The second positioning mechanism includes a pair of spaced apart positioning set screws, which are threadably coupled to the base. That is, the base 352 includes first and second threads for receiving a first positioning set screw 382 and a second positioning set screw 384. Although not shown in detail, the first and second threads extend from the side of the base 352 to the opening 358 in the base 352 so as to allow the set screws 382, 384 to extend into the opening 358 when actuated (e.g., rotated).

The positioning set screws 382, 384 when actuated within their respective threads are configured to engage and exert a force F on the drum support 18 so as to adjust its position. Any suitable configuration of the positioning set screws may be used. In the illustrated embodiment, the positioning set screws 382, 384 are positioned on the base 352 so that they engage the lower drum support 38. The threads in the base 352 are generally parallel to one another and positioned in accordance with a first and a second side 140, 142 of the drum support 18. For example, the first set screw 382 is configured to engage the first side 140 of the drum support 18 and the second set screw 384 is configured to engage the second side 142 of the drum support 18. As such, the alignment of the drum support 18 may be manipulated by moving the set screws 382, 384 into engagement with the drum support 18 and forcing the drum support 18 into a new position. In one embodiment, the set screws 382, 384 are actuated by the same amount so as to move the drum support 18 uniformly. In another embodiment, the set screws 382, 384 are actuated by different amounts so as to move one side of the drum support 18 more than another side 18. This is generally done to improve the eccentricity of the arc of the drum support.

In another embodiment, the positioning system 368 includes a third positioning mechanism for adjusting the position of the drum alignment tool 200 when the drum alignment tool 200 is secured to the spindle assembly 20 of the drum assembly 10. The third positioning mechanism includes a measurement post 388 and a third adjustment screw 390, which is threadably coupled to the second adjustment post 372. The measurement post 388 is coupled to the base 352 and extends upwards therefrom. By way of example, the post 388 may be coupled to the base via screws. The post 388 is arranged to allow a measurement device to engage a surface of the alignment drum 200 or a component of the drum assembly 10. As shown, the measurement post 388 is configured to receive a measurement device 392. Any suitable measurement device may be used. In the illustrated embodiment, the measurement device 392 corresponds to the measurement device 106 of the indicator tool 100 shown in FIG. 3. As such, when the measurement device 106 is removed from the housing 102, the measurement device 106 may be placed in a groove 394, which is disposed in one end of the post 388, and which is similar to the channel 130, i.e., the measurement device 106 is slidably received in the groove 394. The measurement post 388 may include a securement means 396 (e.g., set screw) for holding the measurement device in the groove.

With regards to the third adjustment screw 390, when actuated within its respective thread, it is configured to engage and exert a force F on the drum alignment tool 200 so as to adjust its position. Any suitable configuration of the third adjustment screw may be used. In the illustrated embodiment, the third adjustment screw 390 is positioned on the post 388 so that the third adjustment screw 390 engages reference surface 206 of the drum alignment tool 200 when it is coupled to the spindle assembly 20 as shown in FIG. 4. Furthermore, the thread of the adjustment post 372 is generally aligned with the groove 394 of the measurement post 388. As such, when the lower drum support screws 40 are loosened, the third adjustment screw 390 maybe used to reposition the drum support 18 while the measuring device measures the displacement of the drum alignment tool 200 relative to the spindle axis 54. In most cases, this is accomplished when the measuring device 106 measures a negative displacement that is towards the third adjustment screw 390, i.e., the alignment drum may be moved in a positive direction towards the measuring device until the correct position is obtained.

In another embodiment, the positioning system 368 includes a fourth positioning mechanism for adjusting the position of the inner drum 14 of the drum assembly 10. For example, the fourth positioning mechanism may be used to position the inner drum 14 relative to the spindle axis 54. The fourth positioning mechanism includes the measurement post 388, and a fourth adjustment screw 398, which is threadably coupled to the second adjustment post 372. The fourth adjustment screw 398 when actuated within its respective thread is configured to engage and exert a force $F_4$ on the inner drum 14 so as to adjust its position. Any suitable configuration of the fourth adjustment screw may be used. In the illustrated embodiment, the fourth adjustment screw 398 is positioned on the post 372 so that the fourth adjustment screw 390 engages the outer peripheral surface of the inner drum 14. Furthermore, the thread of the adjustment post 372 is generally aligned with the groove 394 of the measurement post 388. As such, when the screws 28 are loosened, the fourth adjustment screw 398 may be used to reposition the inner drum 14 while the measuring device 106 measures the displacement of the inner drum 14 relative to the spindle axis 54. In most cases, this is accomplished when the measuring device 106 measures a negative displacement that is towards the adjustment screw, i.e., the alignment drum may be moved in a positive direction towards the measuring device until the correct position is obtained.

It should be noted that the above configuration of the fixture is not a limitation and that the fixture can take many forms. For example, the base 352 may include a recess 400 for placement of parts such as screws. In addition, the base 352 may include a hole 402 for receiving auxiliary tools used to help align the drum assembly. The hole 402 is generally configured to receive an auxiliary tool post similar to the posts 370, 372 or 388.

In one embodiment, the auxiliary tool is a reference guide for providing a tangent surface. The tangent surface may be arranged to abut any one of the components of the drum assembly or alignment tools so as to improve eccentricity. For example, the tangent surface may be set at a predetermined distance relative to the spindle axis. In one implementation, the position of tangent surface relative to the spindle axis corresponds to the distance of the outer peripheral surface of the alignment drum relative to the spindle axis. In another implementation, the position of tangent surface relative to the spindle axis corresponds to the distance of the outer peripheral surface of the upper drum relative to the spindle axis. In yet another implementation, the position of tangent surface relative to the spindle axis corresponds to the distance of the outer peripheral surface of the spindle relative to the spindle axis.

In another embodiment, the auxiliary tool is a head tip projection tool for measuring the position of the heads of the inner drum relative to the spindle axis. By way of example, the head tip projection tool may be similar to the measurement post 388. That is, the head tip projection tool may include a post for insertion into the hole and a groove for receiving a measuring device. The post is generally configured to position the measuring device adjacent the heads of the inner so that the indicator arm abuts the outer peripheral surface of the heads.

Figure 6:
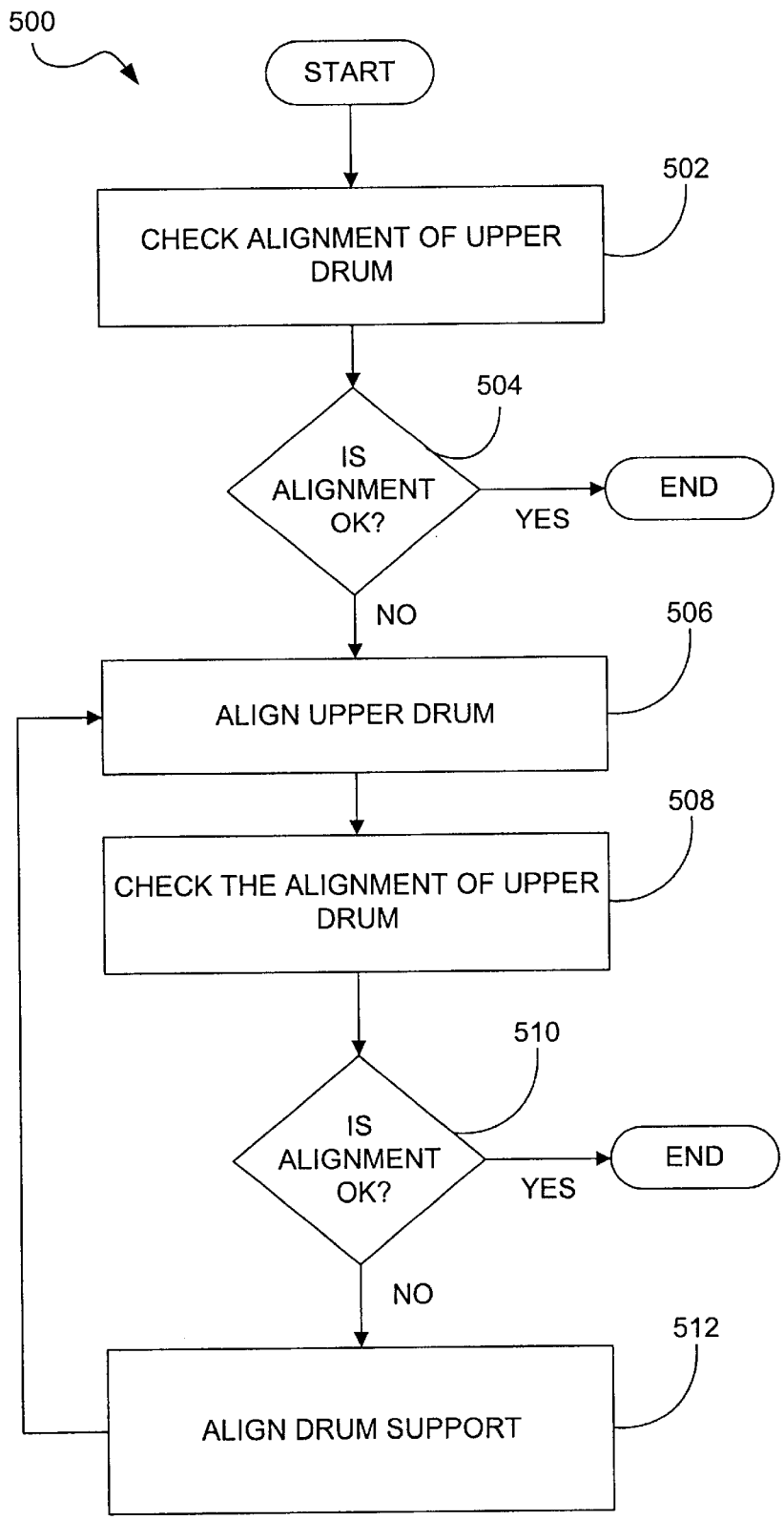
FIG. 6 is a flow diagram illustrating a drum alignment procedure, in accordance with one embodiment of the present invention.

FIG. 6 is a flow diagram illustrating a drum alignment procedure 500, in accordance with one embodiment of the present invention. Prior to starting the alignment procedure 500 conventional pre-alignment steps may be performed. For example, some pre-alignment steps may include removing a top machine cover, an elevator cover, and/or a transport trim cover. In addition, other pre-alignment steps may include removing a rotary head cleaner assembly, an upper drum cover, and/or brush/slip ring assembly. These pre-alignment steps are readily understood by those skilled in the art and for the sake of brevity will not be discussed in greater detail. It should be noted, however, that some of these steps are described in a maintenance manual distributed by the Sony Corp. and titled, "Digital Videocassette Recorder DVW-A500/500" (1$^{st}$ Edition—Revised 3), which is herein incorporated by reference. Moreover, the pre-alignment steps may include removing the drum assembly from the video recorder, and placing the drum assembly in a fixture.

The alignment procedure 500 begins at step 502 where the alignment or eccentricity of the upper drum 12 is checked relative to the spindle axis 54. This is typically accomplished using an indicator tool such as a dial indicator or the indicator tool 100 shown in FIG. 3. In one embodiment, a measuring device is rotatably positioned relative to the spindle axis 54 and a measuring probe is set at a peripheral surface of the upper drum 12. Once positioned, the alignment or eccentricity of the upper drum 12 is measured via the measuring probe by rotating the measuring device about the spindle axis 54. When using the indicator tool 100, the indicator tool 100 is positioned on the spindle pad 48 and the measuring probe 120 is set at the outer peripheral surface 13 of the upper drum 12 (see FIGS. 3C and 3D). It should be noted, however, that this is not a limitation and that other embodiments may include positioning the indicator tool 100 relative to the inner drum 14 or even relative to the spindle 46. In yet other embodiments, the probe may be set relative to the inner peripheral surface of the upper drum 12.

Subsequent to step 502, the process flow proceeds to step 504 where a determination is made as to whether the upper drum 12 is aligned (yes) or mis-aligned (no). If the determination is that the upper drum 12 is aligned (or eccentric) then the process flow ends. If the determination is that the upper drum is mis-aligned (or non eccentric) then the process flow proceeds to step 506. In general, the determination is made (as the indicator tool is rotated) by deciding whether or not the deviation of the probe is within a desired limit. By way of example, it has been found that a maximum deviation of 0.0002 inches (two divisions on the dial indicator) works well. It should be noted, however, that this is not a limitation and that the amount of deviation may vary according to the specific needs of each device.

In step 506, the upper drum 12 is aligned relative to the spindle axis 54. This is generally accomplished by adjusting the position of the upper drum 12 relative to the spindle axis 54. In one embodiment, the position of the upper drum 12 is adjusted by repositioning the upper drum support 36 relative to the lower drum support 38. This may be accomplished by loosening the upper drum support screws 36, moving the upper drum 12 to the desired position, and tightening the upper drum support screws 36 while maintaining the desired position.

Following step 506, the process flow proceeds to step 508 where the alignment or eccentricity of the upper drum 12 is checked relative to the spindle axis 54. This step is analogous to step 502 above. For example, the measuring device is rotatably positioned relative to the spindle axis 54 and the measuring probe is set at a peripheral surface of the upper drum 12. Once positioned, the alignment or eccentricity of the upper drum 12 is measured via the measuring probe by rotating the measuring device about the spindle axis 54.

Subsequent to step 508, the process flow proceeds to step 510 where a determination is made as to whether the upper drum 12 is aligned (yes) or mis-aligned (no). This step is analogous to step 504 above. For example, if the determination is that the upper drum 12 is aligned (or eccentric) then the process flow ends. In addition, if the determination is that the upper drum 12 is mis-aligned (e.g., if not able to center the upper drum assembly within 0.0002 inches) then the process flow proceeds to step 512. Again, the determination is made (as the indicator tool is rotated) by deciding whether or not the deviation of the probe is within a desired limit.

In step 512, the drum support 18 is aligned relative to the spindle axis 54. This is generally accomplished by adjusting the position of the lower drum support 38 relative to the spindle axis 54. In most cases, the lower drum support 38 is adjusted after the upper drum 12 has been removed. In one embodiment, the position of the lower drum support 38 is adjusted by repositioning the lower drum support 38 relative to the lower drum 16. This may be accomplished by loosening the lower drum screws 42, moving the lower drum support 38 to the desired position, and tightening the lower drum screws 42 while maintaining the desired position. In one embodiment, the lower drum support 18 is aligned without using the drum alignment tool 200. In another embodiment, the lower drum support 18 is aligned using the drum alignment tool 200. In this embodiment, the alignment tool 200 shown in FIG. 4 generally acts as a guide for determining the desired position of the lower drum support 38. For example, the alignment tool 200 is positioned relative to the spindle axis 54 and the drum support 18 is positioned relative to the alignment tool 200. This particular embodiment is shown in FIG. 4C. Following step 512, the process flow proceeds to step 506 where the upper drum 12 is aligned relative to the spindle axis 54. As was stated previously, in most cases, the upper drum is removed when aligning the drum support, and therefore, the upper drum must be repositioned on the drum assembly after aligning the drum support.

As should be appreciated, when the process flow ends, conventional post-alignment steps are performed. For example, some post-alignment steps may include reinstalling the brush/slip ring assembly, the upper drum cover and/or the rotary head cleaner assembly. In addition, other post-alignment steps may include reinstalling the transport trim cover, the elevator cover, and/or the top machine cover. These post-alignment steps are readily understood by those skilled in the art and for the sake of brevity will not be discussed in greater detail.

Figure 7:
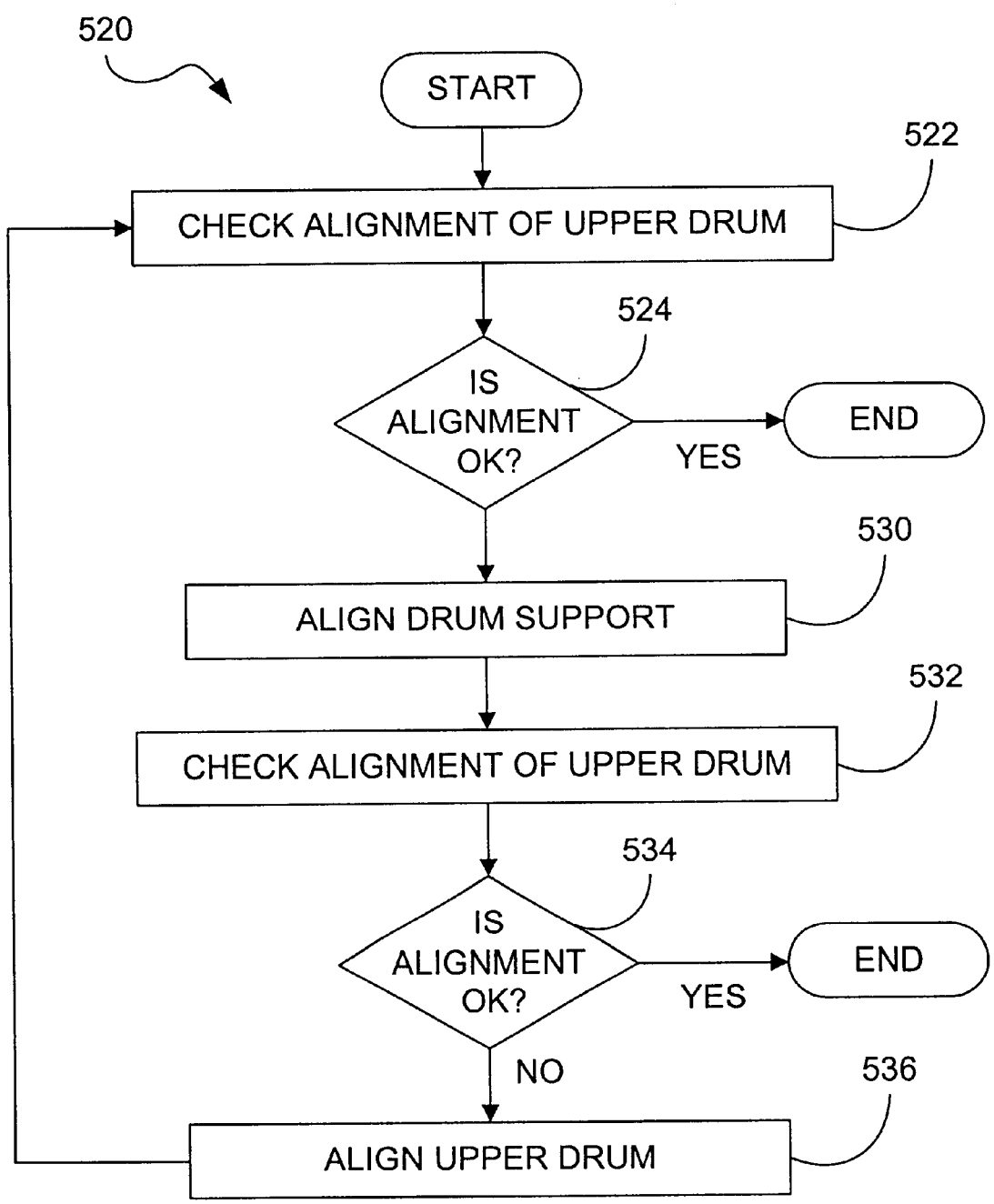
FIG. 7 is a flow diagram illustrating a drum alignment procedure, in accordance with another embodiment of the present invention.

FIG. 7 is a flow diagram illustrating a drum alignment procedure 520, in accordance with another embodiment of the present invention. Prior to starting the alignment procedure 520 conventional pre-alignment steps may be performed (see above). The alignment procedure 520 begins at step 522 where the alignment or eccentricity of the upper drum 12 is checked relative to the spindle axis 54. This is typically accomplished using an indicator unit such as a dial indicator or the indicator tool 100 shown in FIG. 3. Following step 522, the process flow proceeds to step 524 where a determination is made as to whether the upper drum 12 is aligned (yes) or mis-aligned (no). If the determination is that the upper drum 12 is aligned (or eccentric) then the process flow ends. If the determination is that the upper drum is mis-aligned (or non-eccentric) then the process flow proceeds to step 530. In general, the determination is made (as the indicator tool is rotated) by deciding whether or not the deviation of the probe is within a desired limit.

In step 530, the drum support is aligned relative to the spindle axis 54. This is generally accomplished by adjusting the position of the lower drum support 38 relative to the spindle axis 54. In one embodiment, the position of the lower drum support is adjusted by repositioning the lower drum support 38 relative to the lower drum 16. This may be accomplished by loosening the lower drum screws 42, moving the lower drum support 38 to the desired position, and tightening the lower drum screws 42 while maintaining the desired position. Following step 530, the process flow proceeds to step 532 where the alignment of the upper drum 12 is checked. This step is analogous to step 522 above. Following step 532, the process flow proceeds to step 534 where a determination is made as to whether the upper drum 12 is aligned (yes) or mis-aligned (no). This step is analogous to step 524 above. For example, if the determination is that the upper drum 12 is aligned (or eccentric) then the process flow ends. If the determination is that the upper drum 12 is mis-aligned (or non-eccentric) then the process flow proceeds to step 536.

In step 536, the upper drum is aligned relative to the spindle axis. In one embodiment, the position of the upper drum 12 is adjusted by repositioning the upper drum support 36 relative to the lower drum support 38. This may be accomplished by loosening the upper drum support screws 40, moving the upper drum 12 to the desired position, and tightening the upper drum support screws 40 while maintaining the desired position. Following step 536, the process flow proceeds to step 522 where the alignment of the upper drum 12 is checked relative to the spindle axis 54. It should be noted that several iterations of checking the alignment and aligning may be needed. When the process flow ends, conventional post-alignment steps are performed (see above).

Figure 8:
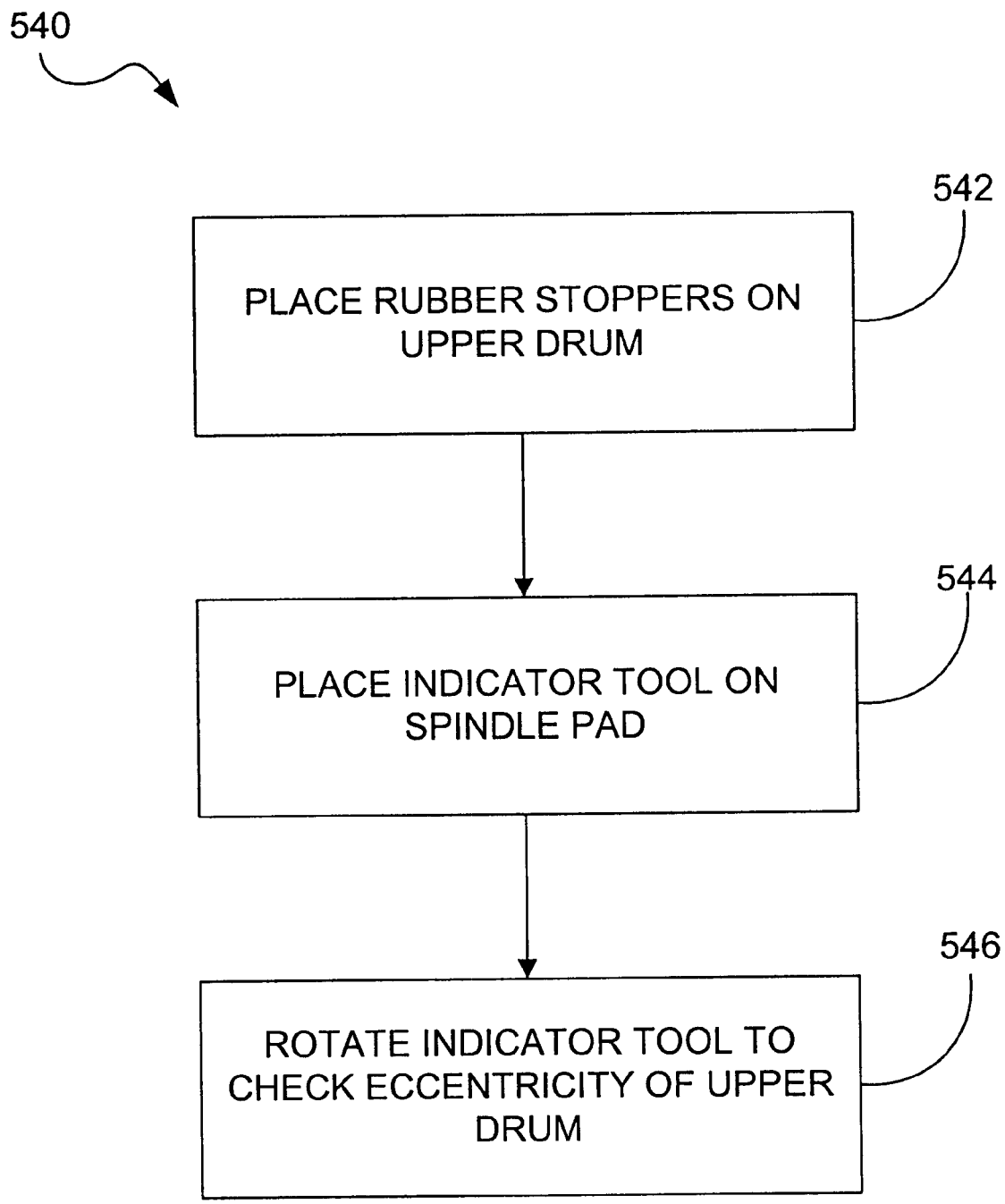
FIG. 8 is a flow diagram illustrating an alignment checking procedure, in accordance with one embodiment of the present invention.

FIG. 8 is a flow diagram illustrating an alignment checking procedure 540, in accordance with one embodiment of the present invention. By way of example, alignment checking procedure 540 may generally correspond to steps 502, 508, 522, or 532 of FIGS. 6 and 7. In general, the alignment checking procedure 540 is arranged to check the alignment or eccentricity of the upper drum 12 relative to the spindle axis 54. The alignment checking procedure 540 begins at step 542 where the rubber stoppers 175 are placed in the holes 71 located on the top surface of the upper drum 12 (holes closest to the drum support 18). The rubber stoppers 175, when positioned in the holes 71, are configured to prevent an indicator tool from contacting the drum support 18. This is done to protect both the indicator tool and the drum support 18 during rotation of the indicator tool about the spindle axis 54.

Following step 542, the process flow proceeds to step 544 where an indicator tool is connected to the spindle assembly. In one embodiment, the indicator tool corresponds to the indicator tool 100 of FIG. 3. In this embodiment, the holding device 104, and more particularly the slotted mount 112, of the indicator tool 100 is placed in the center guide 34 of the spindle pad 48. As shown in FIG. 3C, the slotted mount 112 extends through the cavity 32 in the inner drum 14 where the slip ring was just removed. During placement, the locking arm 108 of the indicator tool 100 is moved from a first position to a second position to secure the slotted mount 112 in the guide 34. Once secured, the indicator tool 100 rotates about the spindle axis 54 via the spindle pad 48. In one implementation, the measuring probe 120 of the indicator tool 100 is pre-set to contact the outer peripheral surface 13 of the upper drum 12 and to allow full dial movement while the indicator tool 100 is rotated from a first point to a second point (i.e., from one rubber stop to the other rubber stop). However, if an adjustment is needed, the set screw 130 on the housing 102 may be loosened and the measuring device may be slid back and forth until there is enough range, i.e., until the tip of the indicator tool abuts the outer peripheral surface of the upper drum. In most cases, the probe 124 is slid back and forth until the desired measurement range is provided.

Following step 544, the process flow proceeds to step 546 where the indicator unit is rotated (counter clockwise) to check the eccentricity (TIR) of the upper drum 12 to the spindle axis 54. When using the indicator tool 100, the indicator tool 100 is first rotated (clockwise) to a first rubber stop and the gauge is set to zero. Thereafter, the indicator tool 100 is rotated (counter clockwise) from the first rubber stop to the second rubber stop so as to determine the amount of deviation along the outer peripheral surface 114 of the upper drum 12 relative to the spindle axis 54. Once the amount of deviation has been determined, the indicator tool 100 is removed from the guide 34 by loosening the locking arm 108 and lifting the indicator tool 100.

Figure 9:
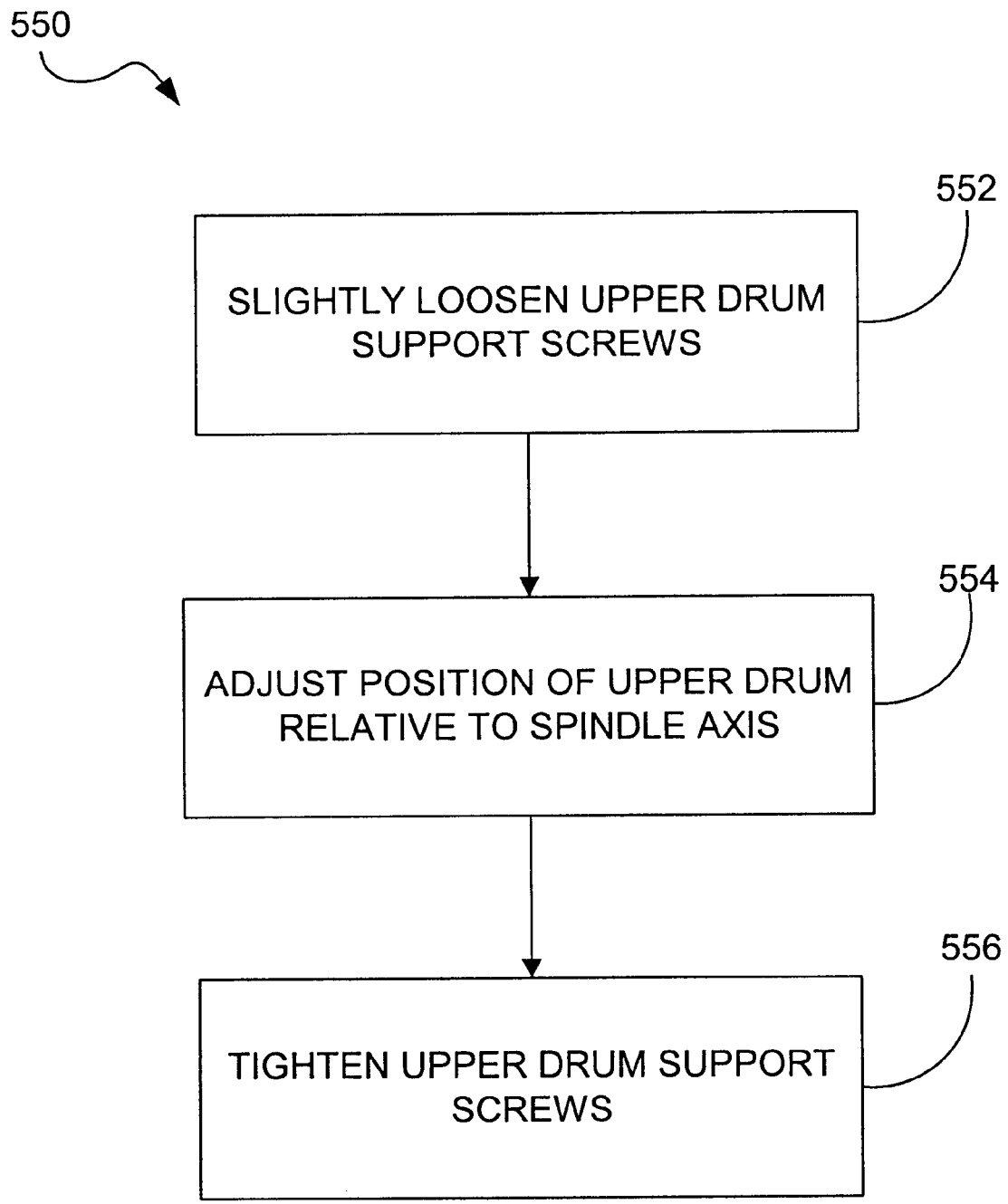
FIG. 9 is a flow diagram illustrating an upper drum alignment procedure, in accordance with one embodiment of the present invention.

FIG. 9 is a flow diagram illustrating an upper drum alignment procedure 550, in accordance with one embodiment of the present invention. By way of example, the upper drum alignment procedure 550 may generally correspond to steps 506 and 536 shown in FIGS. 6 and 7. This procedure is implemented when the eccentricity (TIR) of the upper drum is off or out of alignment, e.g., if not able to center the upper drum assembly within 0.0002 inches. Prior to starting the alignment procedure 550 conventional pre-alignment steps may be performed. For example, it may be necessary to verify that the leaf spring 45 is secure and adequate tension is applied to support the upper drum. The upper drum alignment procedure 550 begins at step 552 where the upper drum support screws 40, which hold the upper drum support 36 to the lower drum support 38, are slightly loosened. By slightly loosed, it is meant that the screws 40 are loosened to the point where the upper drum 12 has a small amount of play or movement relative to the lower drum support 38.

Following step 552, the process flow proceeds to step 554 where the upper drum 12 is positioned relative to the spindle axis 54. That is, once the screws 40 have been loosened, the upper drum is moved or adjusted until it is centered about the spindle axis 54. In one embodiment, the adjustment is implemented by hand. In another embodiment, the adjustment is implemented with a fixture. By way of example, the fixture 350 shown in FIG. 5 may be used. In either case, adjustments are typically made by measuring the displacement of the upper drum relative to the spindle axis and moving the upper drum to adjust for the displacement. In one embodiment, adjustments are made by rotating the indicator tool 100 slowly about the spindle axis 54, stopping the rotation in a position where the deviation is maximum, and pushing the upper drum 12 (with a finger or an adjustment screw) towards the measuring probe 125 from a position opposite (180 degrees) the measuring probe 125 so that the deviation is ½ of the maximum value.

Following step 554, the process flow proceeds to step 556 where the upper drum support screws are tightened. Generally, the upper drum support screws 40 are tightened alternately and gradually, and in steps, to a tightening torque of about 8 Kgf.cm. For example, a first step may include tightening the screws to 2 Kgf.cm, a second step may include tightening the screws to 4 Kgf.cm, and a third step may include tightening the screws to 8 Kgf.cm.

The upper drum positioning procedure 502 begins at step 600 where the alignment is checked at various positions around the periphery (circumference) of the upper drum. For example, the alignment may be checked at the sides or the center (position of drum support) of the upper drum.

Figure 10:
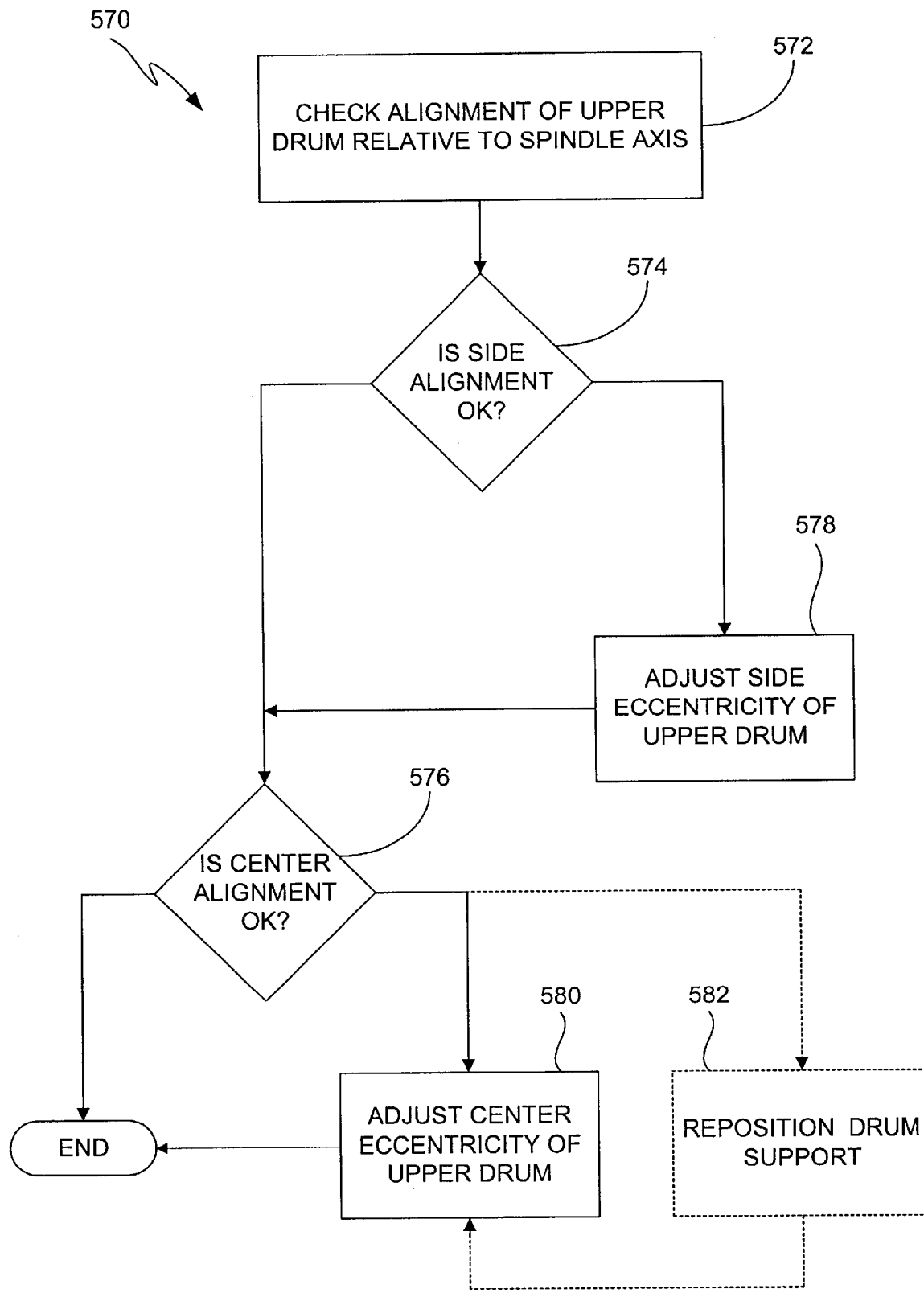
FIG. 10 is a flow diagram illustrating an upper drum positioning procedure, in accordance with one embodiment of the present invention.

FIG. 10 is a flow diagram illustrating an upper drum positioning procedure 570, in accordance with one embodiment of the present invention. By way of example, the upper drum positioning procedure 570 may generally correspond to step 554 shown in FIG. 9. Prior to starting the procedure 570 conventional pre-positioning steps may be performed. For example, it may be necessary to verify that the leaf spring 45 is backed away from the upper drum. The upper drum positioning procedure 570 begins at step 572 where the alignment of the upper drum relative to the spindle axis is checked. By way of example, step 572 may correspond to the procedure shown in FIG. 8. In most cases, the alignment is checked at various positions around the periphery (circumference) of the upper drum. For example, the alignment may be checked at the sides or the center of the upper drum. In one embodiment, the indicator tool is moved to three points along the outer peripheral surface 13 of the upper drum 12. Referring to FIG. 3D, for example, the indicator tool 100 may be rotated to point A, which is located just before the first rubber stopper, to point C, which is located across from the drum support 18, and to point B, which is located just before the second rubber stopper. In most cases, points A and B are 180 degrees from one another, and point C is 180 degrees from the center of the drum support 18. In general, the dial indicator is zeroed at point A, and rotated to points B and C using the measurement at point A as a base measurement.

After step 572, the process flow proceeds to step 574 where a determination is made as to whether the side alignment is ok. In one embodiment, the side alignment corresponds to the deviation between points A and B relative to the spindle axis. The determination is generally made by deciding whether or not the deviation between points A and B is within a desired limit. In one implementation, the desired limit is about 0.0002 inches. If the determination is that the side alignment is ok (i.e., the deviation is less than 0.0002 inches) then the process flow proceeds to step 576. If the determination is that the side alignment is not o.k. (i.e.,. the deviation is more than 0.0002 inches) then the process flow proceeds to step 578.

In step 578, the side eccentricity of the upper drum is adjusted. This is generally accomplished by rotating the indicator tool 100 to the side of negative displacement (e.g., the side that is closer to the spindle axis), slightly loosening the upper drum support screws 40, and applying a force to the outer peripheral surface 13 of the upper drum 12 in a direction towards the side of negative displacement until the deviation is ½ of the measured value. For example, if the negative displacement is on the side of point B, then a force is applied on point A to move point A closer to the spindle axis 54 and point B further from the spindle axis 54. In one embodiment, the force is applied by a finger of an operator. In another embodiment, the force is applied by the adjustment screws 374, 376 of the fixture 350 shown in FIG. 5. For example, if the negative displacement is on the side of the first adjustment post 370 then the second adjustment screw 376 is moved towards the first adjustment post 370. If the movement is impeded by the first adjustment screw 374, then the first adjustment screw 374 may also be moved in that direction. Several iterations of the above may be needed to find the correct position. For example, the adjustment screws 374, 376 may be moved back and forth until the correct position is obtained. Once the correct position is obtained (e.g., deviation is zero), the upper drum support screws 40 may be tightened.

In step 576, a determination is made as to whether the center alignment is ok. In one embodiment, the center alignment corresponds to the deviation between points A and B relative to the spindle axis 54. The determination is generally made by deciding whether or not the deviation at the center is within a desired limit. If the determination is that the center alignment is ok (i.e., the deviation is less than 0.0002 inches) then the process flow proceeds ends. If the determination is that the center alignment is moderately mis-aligned then the process flow proceeds to step 580. In one implementation, moderately mis-aligned corresponds to a deviation between about 0.0002 inches and about 0.0005 inches. If the determination is that the center alignment is badly misaligned then the process flow proceeds to step 582. In one implementation, badly mis-aligned corresponds to a deviation of between about 0.0005 inches and about 0.0010 inches.

In step 580, the center eccentricity of the upper drum is adjusted. This is generally accomplished by rotating the indicator tool to the center position C, slightly loosening the upper drum support screws 40, and applying a force to the outer peripheral surface 13 of the upper drum 12 in a direction towards the side of negative displacement until the deviation is ½ of the measured value. For example, if the negative displacement is on the side of point C, then a force is applied on a point D to move point D closer to the spindle axis 54 and point C further from the spindle axis 54. In one embodiment, the force is applied by a finger of an operator. In another embodiment, the force is applied by an adjustment means, as for example, the drum support set screw 232 located on the drum support 18 or the positioning set screws 382, 384 located on the fixture 350. Several iterations of the above may be needed to find the correct position. Once the correct position is obtained (e.g., deviation is zero), the upper drum support screws 40 may be tightened.

In step 582, the drum support 18 is repositioned, i.e., the drum support may be forcing the upper drum out of position, and therefore its position may need to be adjusted in order to place the upper drum in the correct position. For example, if the point C is positioned away from the spindle axis then the drum support may be positioned to close to the spindle axis 54. Conversely, if the point C is positioned towards the spindle axis then the drum support may be positioned to far away from the spindle axis 54. Repositioning is generally accomplished by loosening the upper drum support screws 40, and uniformly moving the drum support either positively or negatively in accordance with the measured value. Following step 582, the process flow proceeds to step 380. Once the sides and center have been adjusted, final testing of the eccentricity of the upper drum may be implemented.

Figure 11:
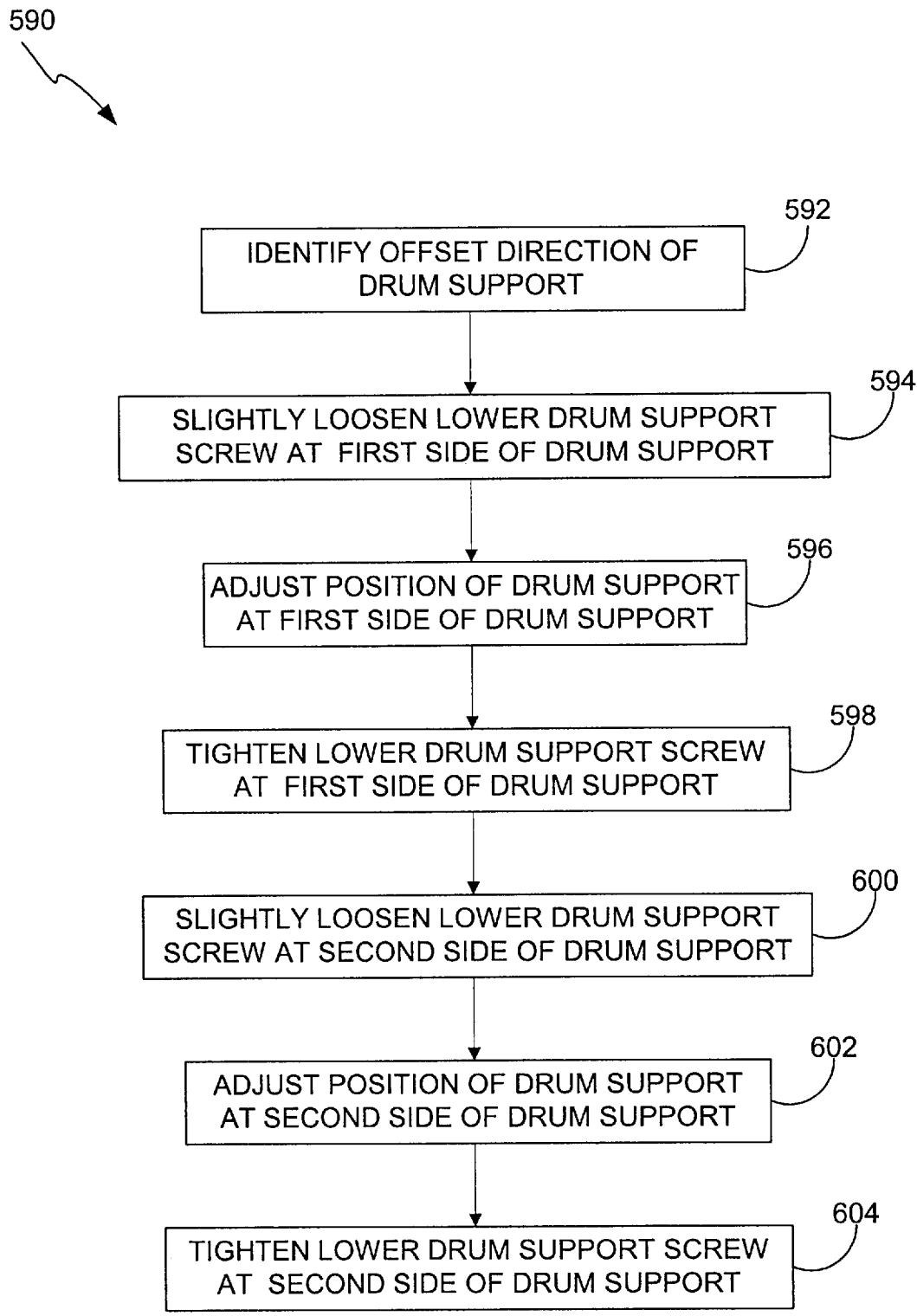
FIG. 11 is a flow diagram illustrating a drum support repositioning procedure, in accordance with one embodiment of the present invention.

FIG. 11 is a flow diagram illustrating a drum support repositioning procedure 590, in accordance with one embodiment of the present invention. By way of example, this procedure may generally correspond to step 582 in FIG. 10. The procedure generally begins at step 592 where the offset direction of the drum support is identified. This is generally accomplished by measuring the displacement of the center position of the upper drum relative to the spindle axis, and making a determination as to whether the drum support needs to move towards the spindle axis or away from the spindle axis. By way of example, an indicator unit such as the indicator tool 100 shown in FIG. 3 may be used to measure the upper drum.

After step 592 the process flow proceeds to step 594 where a lower drum support screw 42 at a first side (e.g., 140) of the drum support 18 is slightly loosened. After step 594, the process flow proceeds to step 596 where the position of the drum support 18 is adjusted at the first side of the drum support 18. This is generally accomplished by moving the first side of the drum support 18 in accordance with the offset direction. For example, if the drum support 18 is offset such that the upper drum 12 is displaced in a positive direction (e.g., a direction away from the spindle axis), the drum support 18 is moved in the opposite direction. Similarly, if the drum support 18 is offset such that the upper drum 12 is displaced in a negative direction (e.g., a direction towards the spindle axis), the drum support 18 is moved in the opposite direction. After step 596, the process flow proceeds to step 598 where the lower drum support screw 42 at the first side is tightened.

Following step 598, the process flow proceeds to step 600 where a lower drum support screw 42 at a second side (e.g., 142) of the drum support 18 is slightly loosened. After step 600 the process flow proceeds to step 602 where the position of the drum support 18 is adjusted at the second side of the drum support 18. This is generally accomplished by moving the second side of the drum support 18 in accordance with the offset direction. In most cases, the second side is moved the same distance and direction as the first side. After step 602, the process flow proceeds to step 604 where the lower drum support screw 42 at the second side is tightened.

Figure 12:
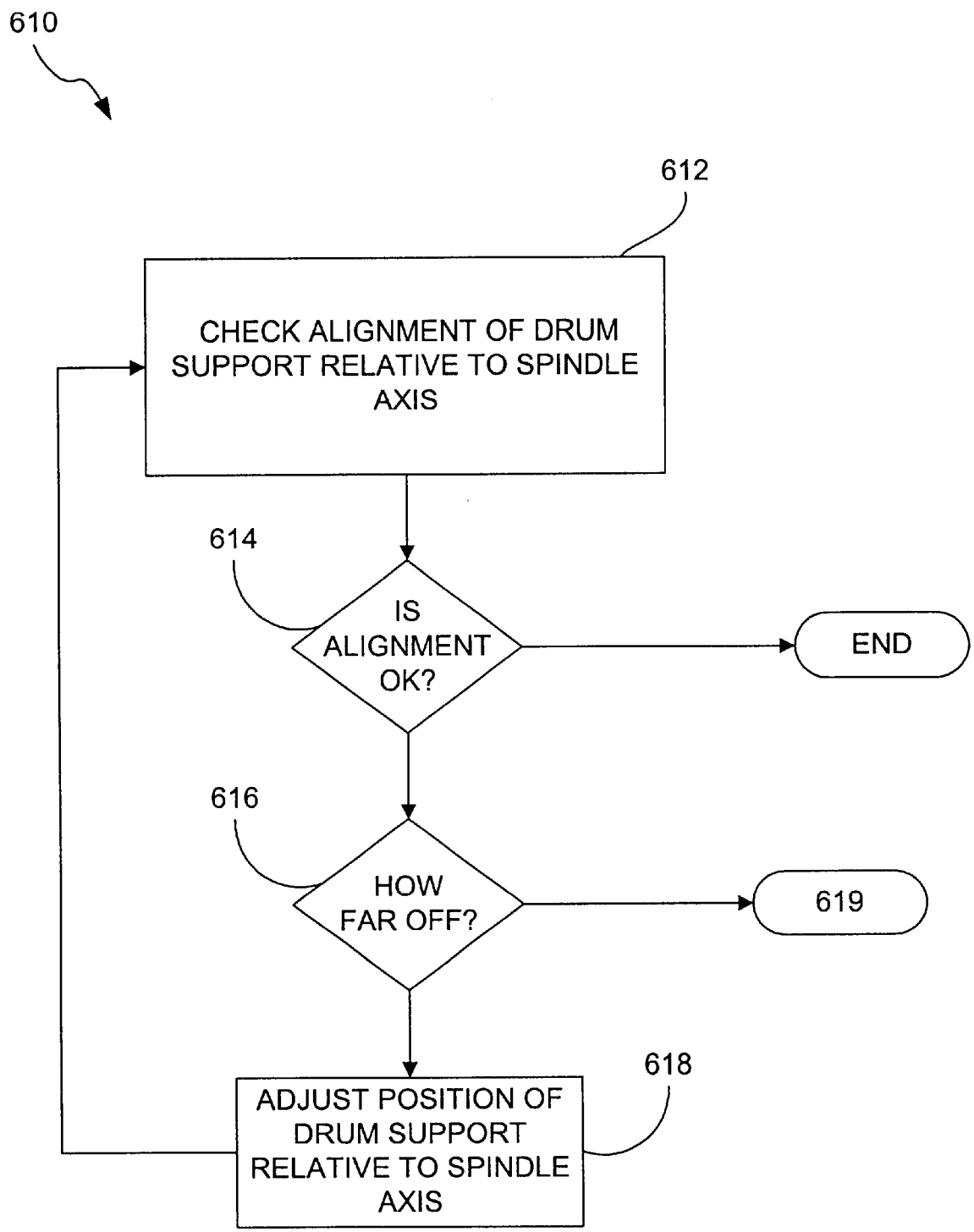
FIG. 12 is a flow diagram illustrating a drum alignment procedure, in accordance with one embodiment of the present invention.

FIG. 12 is a flow diagram illustrating a drum alignment procedure 610, in accordance with one embodiment of the present invention. By way of example, the drum alignment procedure 610 may generally correspond to steps 512 or 530 shown in FIGS. 6 and 7. Prior to starting the alignment procedure 610 conventional pre-alignment steps may be performed. For example, the upper drum may be removed from the drum assembly. The process flow begins at step 612 where the alignment of the drum support 18 relative to the spindle axis 54 is checked. This is generally accomplished by connecting an indicator unit to the spindle assembly, and measuring the displacement of the inner peripheral surface of the drum support relative to the spindle axis. By way of example, the indicator tool may generally correspond to the indicator tool 100 shown in FIG. 3.

Following step 612, the process flow proceeds to step 614 where a determination is made as to whether the drum support 18 is aligned (yes) or mis-aligned (no). If the determination is that the drum support 18 is aligned (or eccentric) then the process flow ends. If the determination is that the drum support 18 is mis-aligned (or non eccentric) then the process flow proceeds to step 616. In general, the determination is made (as the indicator tool is rotated) by deciding whether or not the deviation of the probe is within a desired limit. By way of example, it has been found that a maximum deviation of 0.0002 inches (two divisions on the dial indicator) works well. It should be noted, however, that this is not a limitation and that the amount of deviation may vary according to the specific needs of each device.

In step 616, a determination is made as to how badly the drum support is mis-aligned. If the determination is that the drum support is badly mis-aligned then the process flow proceeds to a more detailed method of aligning the drum support 619. If the determination is that the upper drum is moderately mis-aligned then the process flow proceeds to step 618. In general, the determination is made (as the indicator tool is rotated) by deciding whether or not the deviation of the probe is within a desired limit. By way of example, it has been found that a deviation of greater than 0.0003 inches is badly mis-aligned, and a deviation between about 0.0002 inches and about 0.0003 inches is moderately mis-aligned. It should be noted, however, that this is not a limitation and that the amount of deviation may vary according to the specific needs of each device.

In step 618, the position of the drum support 18 is adjusted relative to the spindle axis 54. This is generally accomplished by repositioning the lower drum support 38 relative to the lower drum 16. For example, the lower drum support screws 42 may be loosened, and a force may be applied to the drum support 18 so as to move it into the correct position, and the lower drum support screws 42 may be tightened while maintaining the desired position. For example, if a first side of the drum support 18 is mis-aligned then the lower drum support screw 42 corresponding to that side may be loosened and a force may be applied to that side to improve the eccentricity of the drum support 18 relative to the spindle axis 54.

As should be appreciated, when the process flow ends, conventional post-alignment steps are performed. For example, some post-alignment steps may include reconnecting the upper drum to the lower drum support or tightening leaf spring so as to cause the upper drum to be biased towards the arc, i.e., force the drum support against the outer peripheral surface of the upper drum.

Figure 13:
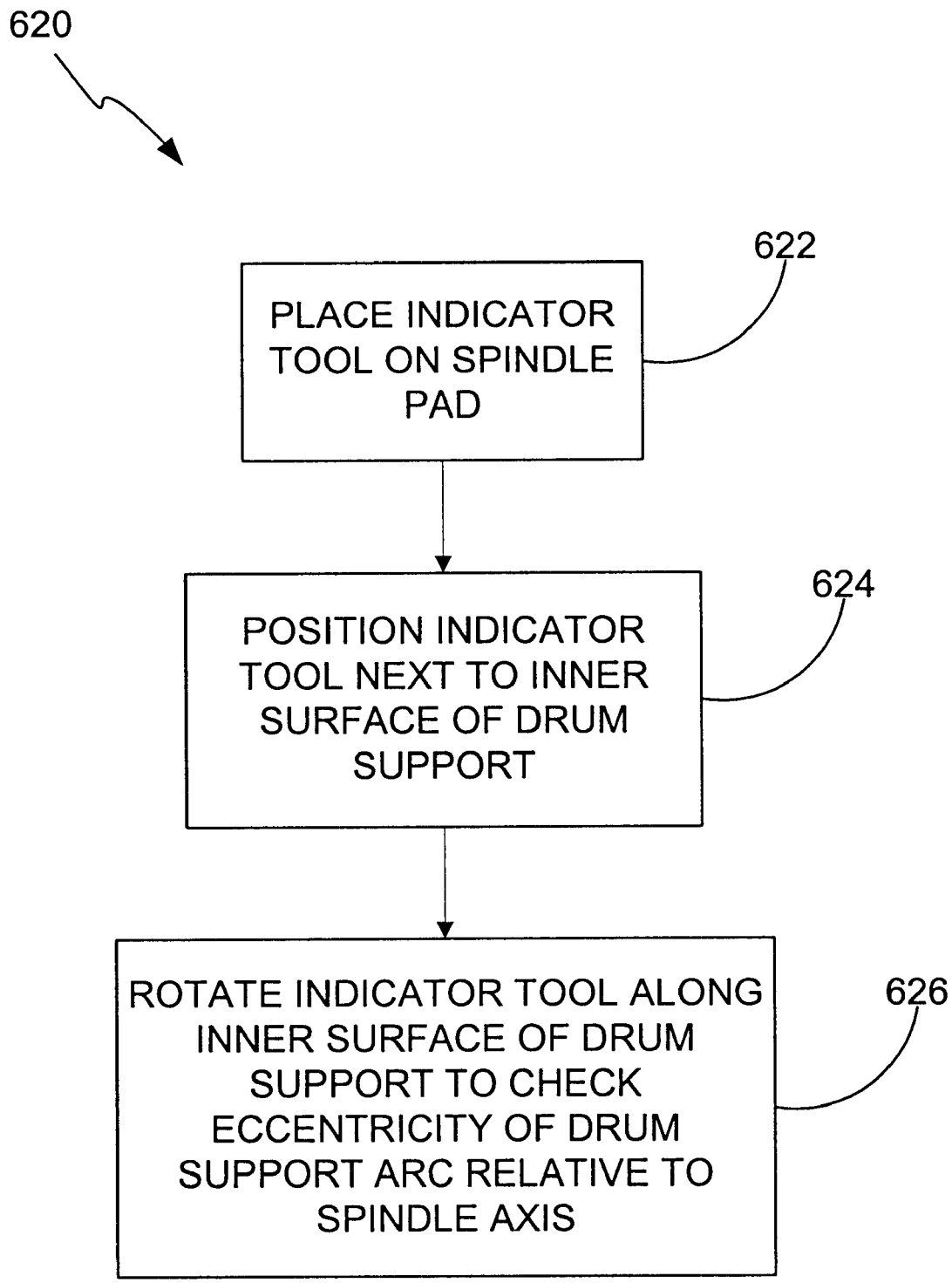
FIG. 13 is a flow diagram illustrating a drum support measuring procedure, in accordance with one embodiment of the present invention.

FIG. 13 is a flow diagram illustrating a drum support measuring procedure 620, in accordance with one embodiment of the present invention. By way of example, the drum support measuring procedure 620 may generally correspond to step 612 shown in FIG. 12. Prior to starting the positioning procedure 620 some pre-positioning steps may be performed. For example, the drum support set screw may be backed off from the drum assembly. The drum support measuring procedure 620 generally begins at step 622 where an indicator tool is connected to the spindle assembly. In one embodiment, the indicator tool corresponds to the indicator tool 100 of FIG. 3. In this embodiment, the holding device 104, and more particularly the slotted mount 112 is placed in the center guide 34 of the spindle pad 48. As shown in FIG. 3E, the slotted mount 112 extends through the cavity 32 in the inner drum 14 where the slip ring was just removed. During placement, the locking arm 108 of the holding device 104 is moved from a first position to a second position to secure the slotted mount 112 in the guide 34. Once secured, the indicator tool 100 rotates about the spindle axis 54 via the spindle pad 48.

Following step 622, the process flow proceeds to step 624 where an indicator tool is positioned next to the inner surface of the drum support (e.g., arc that abuts the upper drum). In the case of the indicator tool, this is generally accomplished by allowing the measuring device 106 to slide relative to the housing 102 so that the measuring probe 120, and more particularly the contact ball 124, contacts the inner peripheral surface 39 of the drum support 18. The angle of the measuring probe 120 may need to be adjusted if the measuring probe 120 is unable to contact the inner peripheral surface 39 using the above technique.

Following step 624, the process flow proceeds to step 626 where the indicator tool is rotated along the inner surface 39 of the drum support 18 to check the eccentricity of the arc relative to the spindle axis 54. This is generally accomplished by rotating the contact ball 124 against the inner surface 39 from the first side 140 of the drum support 18 to the second side 142 of the drum support 18. In one embodiment, the measurement device 106 is zeroed at the first side 140, and thereafter rotated along the inner surface 39 to the second side 142 to determine the eccentricity of the drum support 18.

Figure 14:
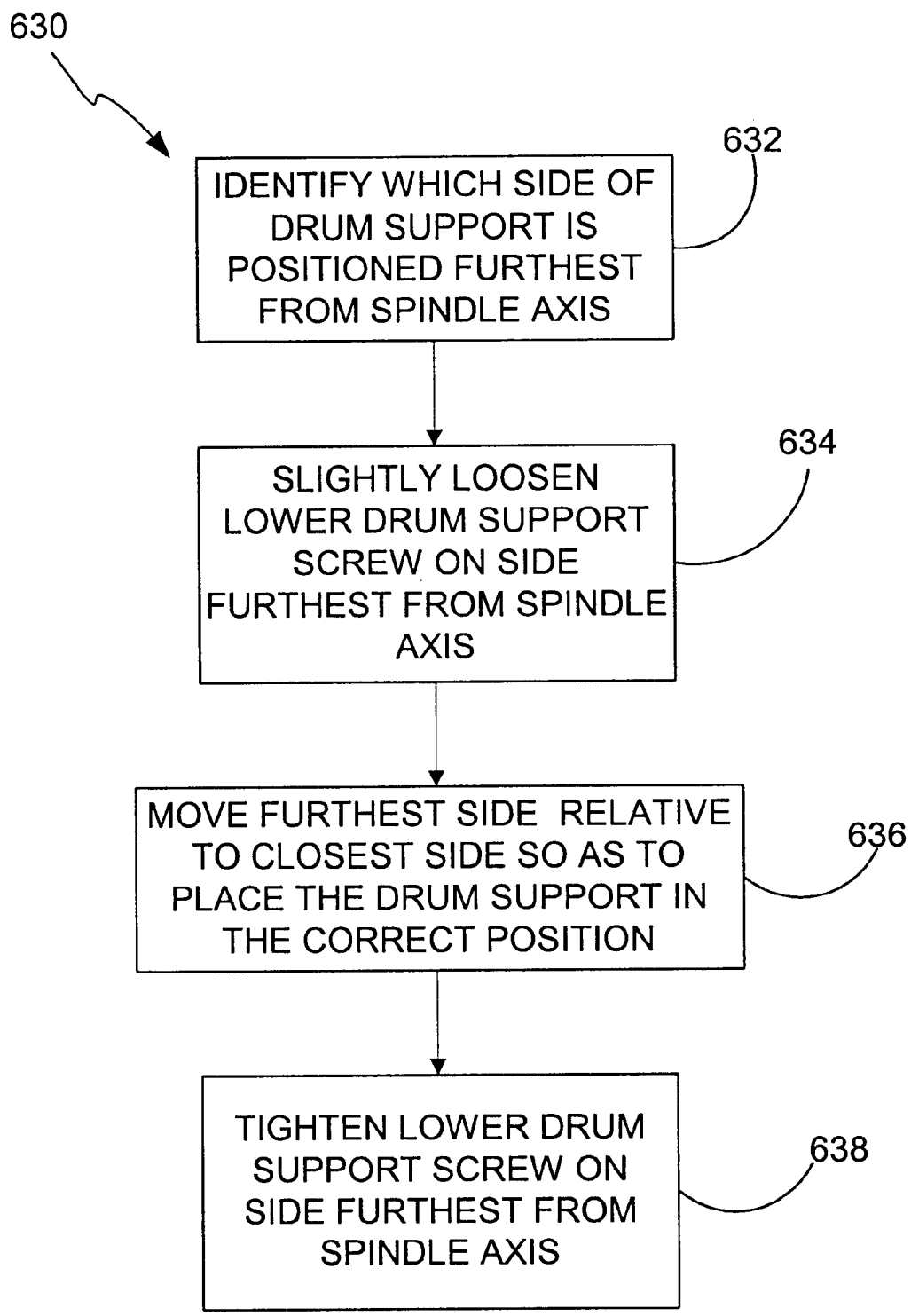
FIG. 14 is a flow diagram illustrating drum support positioning procedure, in accordance with one embodiment of the present invention.

FIG. 14 is a flow diagram illustrating a drum support positioning procedure 630, in accordance with one embodiment of the present invention. By way of example, the drum support positioning procedure 630 may generally correspond to step 618 shown in FIG. 12. The positioning procedure 630 generally begins at step 632 where an identification is made as to which side of the drum support 18 is positioned furthest from the spindle axis 54. This is generally accomplished by measuring the displacement of the drum support 18 at the first and second sides 140, 142 of the drum support 18. For example, the first side 140 may be zeroed out and the indicator tool may be rotated to the second side 142. If the first side 140 is farther away from the spindle axis 54, the gauge of the indicator tool will show a negative displacement at the second side 142 of the drum support 18. If the second side 142 is farther away from the spindle axis 154, the gauge of the indicator tool will show a positive displacement at the second side 142 of the drum support 18.

After step 632, the process flow proceeds to step 634 where the lower drum support screw 42 on the side furthest from the spindle axis 54 is slightly loosened. After step 634, the process flow proceeds to step 636 where furthest side is moved relative to the closest side so as to place the drum support 18 in the correct position. That is, the furthest side is moved to a position that produces a zero displacement relative to the closest side. In one embodiment, this is accomplished by zeroing the indicator tool at the closest side, moving the indicator tool to the furthest side and applying a force to the furthest side until there is zero displacement. In one implementation, the force is produced by a finger of an operator. In another implementation, the force is produce by a positioning set screw, as for example, the positioning set screws 382 and 384 of the fixture 350 shown in FIG. 5. By way of example, depending on the side that needs to be moved towards the spindle axis 54, one of the positioning set screws 382, 384 may be actuated to engage and force the furthest side to the correct position. If the furthest side is moved to far, the drum support set screw 232 may be used to back away the furthest side. Several iterations may be conducted until the correct position is finally obtained. After step 636, the process flow proceeds to step 638 where the lower drum support screw 42 that was previously loosened is tightened while maintaining the correct position.

Figure 15:
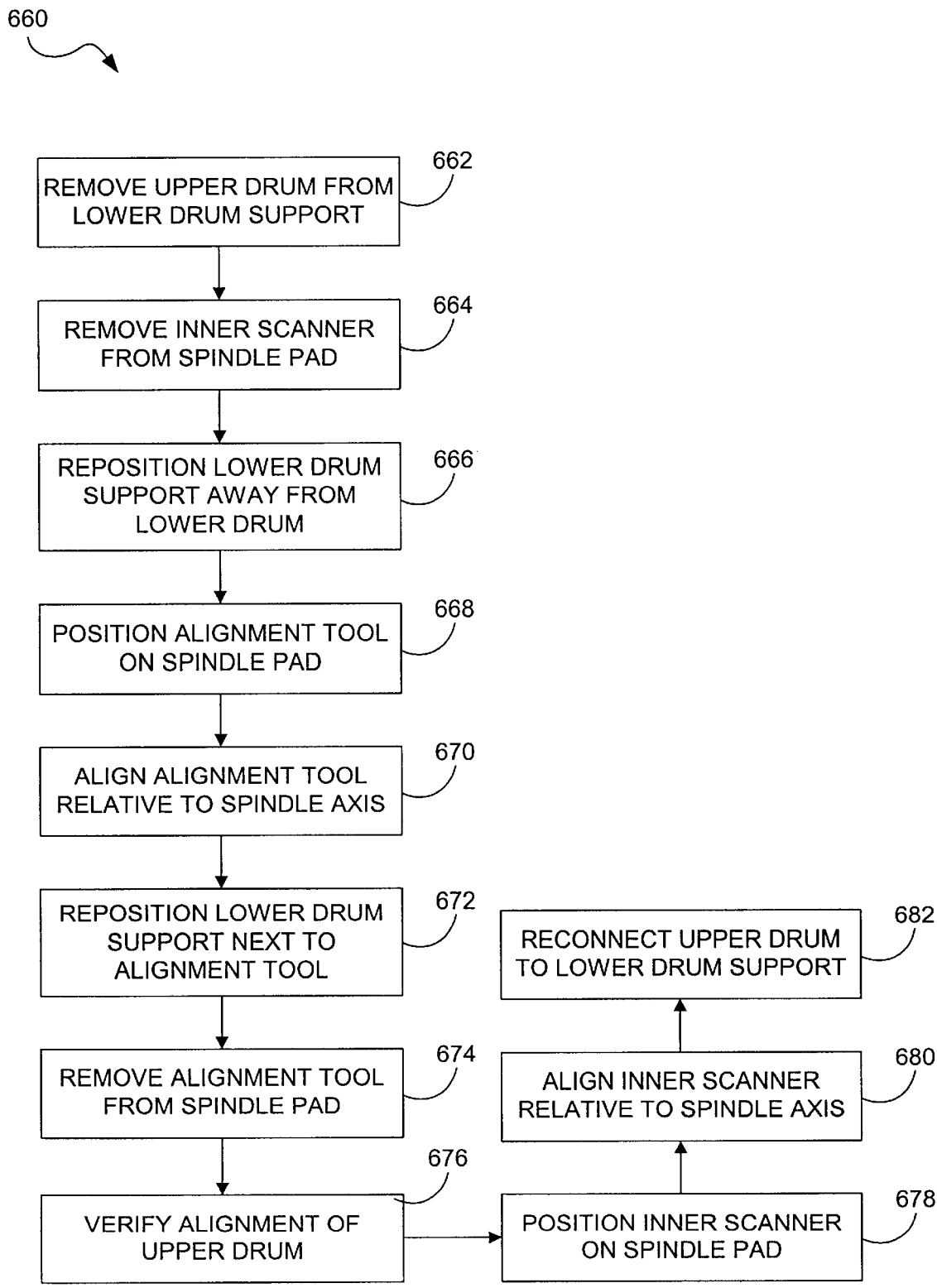
FIG. 15 is a flow diagram illustrating a drum support alignment procedure, in accordance with one embodiment of the present invention.

FIG. 15 is a flow diagram illustrating a drum support alignment procedure 660, in accordance with one embodiment of the present invention. By way of example, the drum support alignment procedure 660 may generally correspond to steps 512, 530 or 619 shown in FIGS. 6, 7 and 12. This procedure is generally implemented because the drum support 18 is too far out of position to adjust the upper drum 12. The drum support alignment procedure 660 begins at step 662 where the upper drum 12 is removed from the lower drum support 38 of the drum support 18. This is generally accomplished by loosening the leaf spring knob 73 (about 4 turns), removing the upper drum support screws 40, and lifting the upper drum 12 away from the lower drum 16. Care should be taken not to damage the tape running surface (i.e., outer peripheral surface 116) of the upper drum 12, the lower edge portion of the upper drum 12, the bottom surface of the upper drum support 36, the top surface of the lower drum support 38, and the upper edge of the lower drum 16.

Following step 662, the process flow proceeds to step 664 where the inner drum 14 is removed from the spindle pad 48. This is generally accomplished by fully loosening the inner drum screws 28 and lifting the inner drum 14 at an incline away from the spindle pad 48. Care should be taken not to damage the top surface of the upper drum support 38.

Following step 664, the process flow proceeds to step 666 where the lower drum support 38 is repositioned away from the lower drum 16. This is generally accomplished by slightly loosening the lower drum support screws 42, sliding the lower drum support 38 away from the outer periphery of the lower drum 16, and re-tightening the lower drum support screws 42. As should be appreciated, this provides a clearance for using the drum alignment tool 200.

Following step 666, the process flow proceeds to step 668 where the alignment tool 200 is positioned on the spindle pad 48. This is generally accomplished by placing the alignment tool 200 over the guide 34 and gently on the flanges 50 of the spindle pad 48, aligning the inner drum screws 28 with the flanges 50 of the spindle pad 48 and slightly tightening the inner drum screws 28 and confirming that no abnormal sounds occur when rotating the alignment tool 200 about the spindle axis 54.

Following step 668, the process flow proceeds to step 670 where the drum alignment tool 200 is aligned relative to the spindle axis 54. This is typically accomplished using a measuring device including a measuring probe. In one embodiment, the measuring device corresponds to a dial indicator. In another embodiment, the measuring device corresponds to the measuring device 106 of the indicator tool 100. In general, the measuring device is fixedly positioned relative to the spindle axis 54 and the measuring probe is set at the reference surface 206 of the upper plate 208. In one embodiment, the drum assembly is placed in the fixture 350 and therefore the measuring device may be placed on the measuring post 388. The alignment or eccentricity of the drum alignment tool 200 is generally determined by rotating the alignment tool 200 (about the spindle axis 54) relative to the fixed measuring device. If the alignment tool 200 is correctly positioned within desired limits then the inner drum screws 28 may be tightened. If on the other hand, the alignment tool 200 is mis-aligned, then the alignment tool may be repositioned until it is the correct position. In one embodiment, a measuring device, which is supplied by the manufacturer, and which is coupled to the video recorder, is used to measure the alignment of the alignment tool 200.

Following step 670, the process flow proceeds to step 672 where the lower drum support 38 is repositioned next to the alignment tool 200. This is generally accomplished by slightly loosening the lower drum support screws 42, sliding the lower drum support 38 into contact with the alignment tool 200 such that the inner peripheral surface 39 of the lower drum support 38 contacts the reference surface 206 of the alignment tool 200, applying a biasing force to the lower drum support 38 to press it against the reference surface 206 of the alignment tool 200, and tightening the lower drum support screws 42. In one embodiment, the biasing screw 122 of the drum alignment tool 200 is used to apply the biasing force. In this embodiment, the insert 212 of the alignment bracket 218 is positioned at the center of the alignment plate 202, the flange 220 is radially aligned with the drum support 18 and the biasing screw 122 is turned to advance the ball 225 against the outer peripheral surface of the drum support 18 such that a biasing force is exerted by the ball on the drum support 18.

Following step 672, the process flow proceeds to step 674 where the alignment tool 200 is removed from the spindle pad 48. This is generally accomplished by fully loosening the inner drum screws 28 and lifting the alignment tool 200 away from the spindle pad 48. Care should be taken not to damage the top surface of the upper drum support 38.

Following step 674, the process flow proceeds to step 676 where the alignment of the upper drum 12 (per drum support 18) is verified. This is generally accomplished by reinstalling the upper drum 12, checking the alignment of the upper drum 12 relative to the spindle axis 54, and determining whether the upper drum 12 is aligned or mis-aligned. If misaligned, a determination is typically made as to whether the mis-alignment can be corrected by repositioning the upper drum. If not, the process flow returns to step 662. If it can be corrected or if it is aligned, the upper drum 12 is removed, and the process flow proceeds to step 678.

In step 678, the inner drum 14 is positioned on the spindle pad 48. This is generally accomplished by radially aligning the inner drum 14 with the drum support 18 (via holes), aligning the guide 34 with a positioning hole of the inner drum 14, placing the inner drum 14 gently on the flanges 50 of the spindle pad 48, tightening the inner drum screws 28 tentatively and equally while pushing from above, and rotating the inner drum (counter clockwise) so as to confirm that no abnormal sounds occur when rotating. Care should be taken not to touch the contact points, flanges, audio TC head, peripheral tape guides, and drum support when installing the inner drum 14.

Following step 678, the process flow proceeds to step 680 where the inner drum 14 is aligned relative to the spindle axis 54. This is generally accomplished using a measuring device and following standard alignment procedures associated with the specific design of the drum assembly 10. Any suitable measuring device may be used. In general, the measuring device is fixed relative to the rotating inner drum. In one embodiment, the measuring device corresponds to the measuring device 106 shown in FIG. 3. For example, the measuring device 106 may be used with the fixture 350 shown in FIG. 5. In another embodiment, a measuring device associated with a dial indicator is used. In this embodiment, the dial indicator is positioned on a chassis in the video recorder 2.

The standard procedure generally begins by positioning the measuring probe of the measuring device next to an alignment surface (e.g., outer peripheral surface) of the inner drum 14. By way of example, the alignment surface may correspond to the outer peripheral surface of the inner drum 14 just above the head assembly 15. After positioning the measuring probe next to the alignment surface, the gauge of the measuring device is zeroed. After zeroing the gauge, the inner drum 14 is slowly rotated (counterclockwise) around the alignment surface of the inner drum 14 to confirm that the pointer deviation of the tool satisfies the specification in one complete turn of the inner drum. Once satisfied, the inner drum screws 28 are gradually tightened in a specific order so as to secure the inner drum 48 to the spindle pad 48. By way of example, the screws may be tightened to 4 kgf-cm and in the order B-A-D-C as shown in FIG. 4G.

Once tightened, the inner drum 14 is slowly rotated around the alignment surface of the inner drum 14 to reconfirm that the pointer deviation of the tool satisfies the specification in one complete turn of the inner drum 14. Thereafter, the inner drum screws 28 are gradually tightened in a specific order. For example, the inner drum screws may be further tightened to 8 kgf-cm in the order B-A-D-C. Once tightened, the inner drum 14 is slowly rotated around the alignment surface of the inner drum 14 to reconfirm that the pointer deviation of the tool satisfies the specification in one complete turn of the inner drum 14.

If the specification is not satisfied in any of the above steps, then repositioning steps are typically performed. Repositioning steps generally include rotating the inner drum slowly (counterclockwise) to the position where the pointer deviation is minimum, pushing the inner drum (board cover) in the position opposite the measuring probe (e.g., 180 degrees) so that the pointer deviation is =b ½ of the maximum value, and confirming that the specification is satisfied. In one embodiment, the pushing is implemented with a finger of an operator. In another embodiment, the pushing is implemented using the fourth adjustment screw 398 of the fixture 350.

After step 680, the process flow proceeds to step 682 where the upper drum 12 is reconnected to the lower drum support 38.

Figure 16:
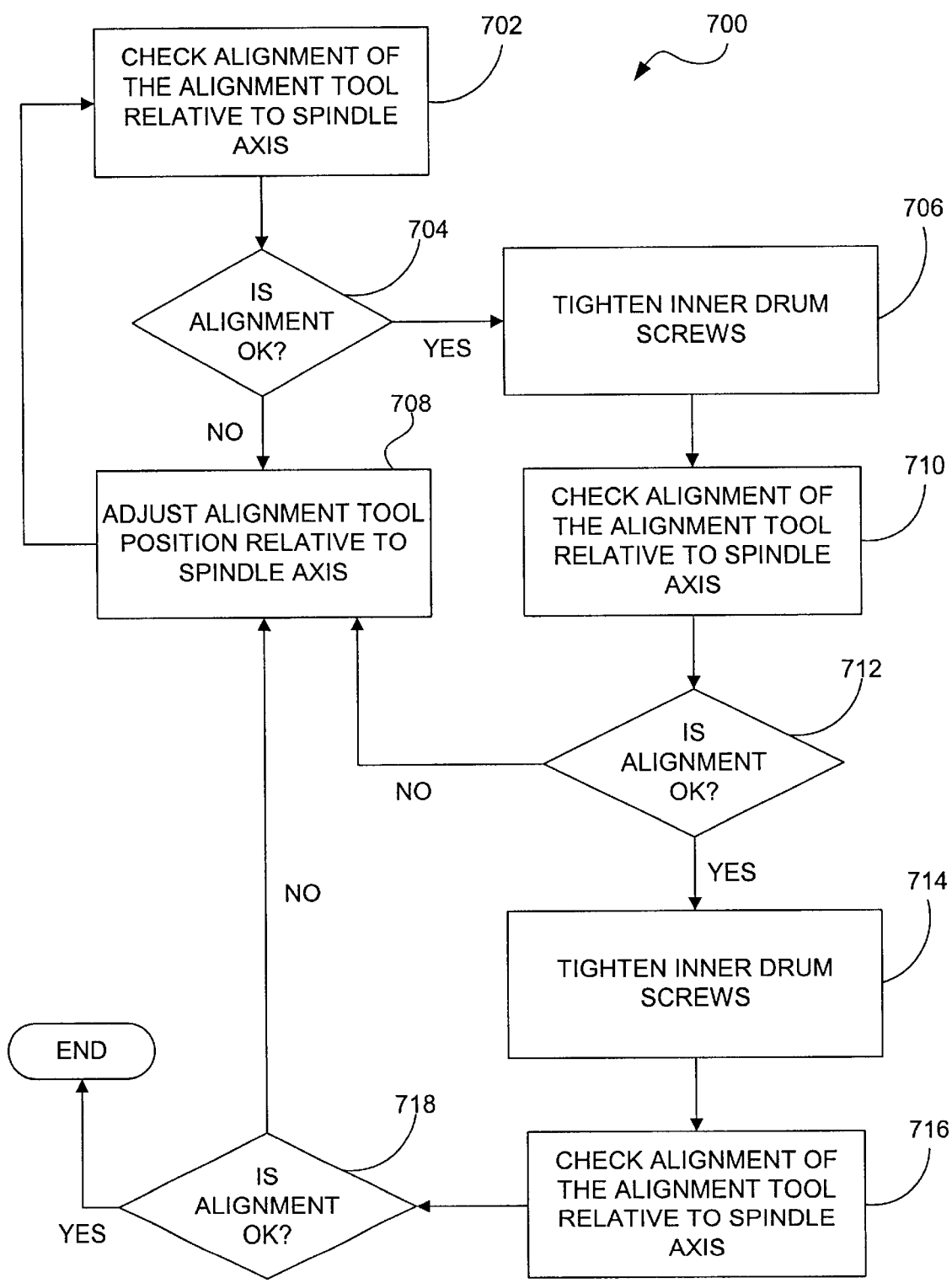
FIG. 16 is a flow diagram illustrating an alignment tool alignment procedure, in accordance with one embodiment of the present invention.

FIG. 16 is a flow diagram illustrating an alignment tool alignment procedure 700, in accordance with one embodiment of the present invention. By way of example, the alignment tool alignment procedure 700 may generally correspond to step 670 shown in FIG. 15. The alignment procedure 700 begins at step 702 where the alignment or eccentricity of the alignment tool 200 is checked relative to the spindle axis 54. This is typically accomplished using a measuring device that includes a measuring probe. In one embodiment, a measuring device corresponding to a dial indicator such as the dial indicator shown in FIG. 4 may be used. Referring to FIG. 4E, for example, the measuring device 300 may be fixed at a known position 306 and the measuring probe 303 may be placed next to the reference surface 206 of the alignment tool 200. In one embodiment, the drum assembly 10 is placed back into the video recorder before aligning the alignment tool 200 and thus the known position may represent a portion of the video recorder. In another embodiment, the measuring device 106 of FIG. 3 may be used along with the fixture 350 of FIG. 5. Referring to FIG. 5, for example, the measuring device 106 may be placed on the measuring post 388, and the measuring probe 120 may be placed next to the reference surface 206 of the alignment tool 200. In this manner, the drum assembly 10 does not have to be put back into the video recorder 2 in order to align the alignment tool 200.

In most cases, the reference surface 206 and the measuring probe are cleaned prior to starting the alignment procedure 700. Once positioned, the alignment or eccentricity of the alignment tool 200 is measured via the measuring probe by rotating the alignment tool 200 about the spindle axis 54. In most cases the alignment tool 200 is rotated one complete turn.

Subsequent to step 702, the process flow proceeds to step 702 where a determination is made as to whether the alignment tool 200 is aligned (yes) or misaligned (no). If the determination is that the alignment tool 200 is aligned (or eccentric) then the process flow proceeds to step 706. If the determination is that the alignment tool 200 is mis-aligned (or non eccentric) then the process flow proceeds to step 708. In general, the determination is made (as the alignment tool is rotated) by deciding whether or not the deviation of the probe (via a gauge) is within a desired limit.

In step 708, the position of the alignment tool 200 is adjusted relative to the spindle axis 54. This is generally accomplished by rotating the alignment tool 200 slowly about the spindle axis 54, stopping the rotation in a position where the deviation is minimum, and pushing the alignment tool 200 towards the measuring probe from a position opposite (180 degrees) the measuring probe so that the deviation is ½ of the maximum value. In one embodiment, the alignment tool is pushed with a finger. In another embodiment, the alignment tool is pushed using the third adjustment screw 390 of the fixture 350. Following step 708, the process flow proceeds back to step 702 where the alignment or eccentricity of the alignment tool 200 is measured via the measuring probe by rotating the alignment tool 200 about the spindle axis 54.

In step 706, the inner drum screws 28 are gradually tightened in a specific order. In one embodiment, the inner drum screws are tightened to 4 kgf-cm. In another embodiment, the screws 28 are tightened in an alternating and opposite order where screw 28A is tightened first, screw 28C is tightened second, screw 28B is tightened third, and screw 28D is tightened fourth. Following step 706, the process flow proceeds to step 710 where the alignment or eccentricity of the alignment tool 200 is measured via the measuring probe by rotating the alignment tool 200 about the spindle axis 54. Step 710 is analogous to step 702 above.

Following step 710, the process flow proceeds to step 712 where a determination is made as to whether the alignment tool 200 is aligned (yes) or mis-aligned (no). If the determination is that the alignment tool 200 is aligned (or eccentric) then the process flow proceeds to step 714. If the determination is that the alignment tool 200 is mis-aligned (or non eccentric) then the process flow proceeds back to step 708. In general, the determination is made (as the alignment tool is rotated) by deciding whether or not the deviation of the probe (via gauge) is within a desired limit. Step 712 is analogous to step 704 above.

In step 714, the inner drum screws 28 are further tightened. In one embodiment, the inner drum screws 28 are tightened to 8 kgf-cm. In another embodiment, the screws 28 are tightened in an alternating and opposite order where screw 28A is tightened first, screw 28C is tightened second, screw 28B is tightened third, and screw 28D is tightened fourth. Following step 714, the process flow proceeds to step 716 where the alignment or eccentricity of the alignment tool 200 is measured via the measuring probe by rotating the alignment tool 200 about the spindle axis 54. Step 716 is analogous to step 702 above. Following step 716, the process flow proceeds to step 718 where a determination is made as to whether the alignment tool 200 is aligned (yes) or mis-aligned (no). If the determination is that the alignment tool 200 is aligned (or eccentric) then the process flow ends. If the determination is that the alignment tool 200 is mis-aligned (or non eccentric) then the process flow proceeds back to step 708. In general, the determination is made (as the alignment tool is rotated) by deciding whether or not the deviation of the probe (via gauge) is within a desired limit. Step 718 is analogous to step 704 above.

The advantages of the invention are numerous. Different embodiments or implementations may have one or more of the following advantages. One advantage of the invention is that the upper drum can be aligned to the lower drum thus improving the tape path, i.e., reduce tape wear. Another advantage of the invention is that more consistent wear and improved longevity of the video recorder and the drum assembly is achieved thus reducing costs. Another advantage of the invention is that an aligned upper drum reduces sticktion, i.e., tape sticking to side of drum assembly. Another advantage of the invention is that head to tape contact can be optimized. Another advantage of the invention is that RF performance can be maximized.

While this invention has been described in terms of several preferred embodiments, there are alterations, permutations, and equivalents, which fall within the scope of this invention. For example, although the tools and methods of the present invention have been directed at drum assemblies of video recorders associated with digital beta formats (DVW, DNW, HDW), it should be noted that this is not a limitation and that the tools and methods may also be applied to drum assemblies of video recorders using other formats, as for example, other digital formats (D2/D1) or analog beta formats (SP Beta).

It should also be noted that there are many alternative ways of implementing the methods and apparatuses of the present invention. For example, although the indicator tool was shown as connecting to the spindle assembly, it may be configured to couple to other components of the drum assembly. In one embodiment, for instance, the indicator tool may include a holding mechanism that connects to the drum support. In one implementation of this embodiment, the holding mechanism may include a pair of holes for allowing the indicator tool to be secured to the drum support using the upper drum support screws and the housing may be elongated so as to place. In a case such as this, the housing may be arranged to extend to the side opposite the drum support so as to place the measurement device in a location for measuring the inner drum or alignment tool when they are rotated about the spindle axis.

It is therefore intended that the following appended claims be interpreted as including all such alterations, permutations, and equivalents as fall within the true spirit and scope of the present invention.

What is claimed is:

1. An indicator tool for checking the alignment of a component of a drum assembly, the drum assembly including a spindle assembly having a rotatable component that rotates about an axis, the drum assembly being used in a video recording device, said indicator tool comprising:
a housing;
a holding mechanism coupled to said housing and securing said indicator tool to said rotatable component of said drum assembly so as to allow said indicator tool to rotate about said axis; and
a measuring device coupled to said housing and measuring the eccentricity of said component when said indicator tool is secured to said rotatable component of said spindle assembly.

2. The tool as recited claim 1 wherein said component is a drum of said drum assembly, and wherein said measuring device is used to measure the eccentricity of said drum relative to said axis.

3. The tool as recited claim 1 wherein said component is a drum support, and wherein said measuring device is used to measure the eccentricity of said drum support relative to said axis.

4. The tool as recited claim 1 wherein said holding mechanism includes a locking rod threadably coupled to said housing, a locking arm structurally coupled to said locking rod, and a slotted mount mechanically disposed between said locking rod and said housing, said slotted mount being adapted for insertion into a guide of said drum assembly, wherein when the locking arm is rotated, the locking rod moves within the housing causing the slotted mount to bulge outwardly, which as a result secures the slotted mount within said guide of said drum assembly.

5. The tool as recited claim 1 wherein said housing includes a channel for slidably receiving said measuring device.

6. The tool as recited claim 1 wherein said measuring device includes an indicator unit for housing the inner workings of said measuring device, a measuring probe for contacting a surface to be measured, and an output gauge for outputting the displacement of said surface being measured.

7. The indicator tool as recited in claim 2 wherein said drum corresponds to an upper drum of said drum assembly.

8. The tool as recited claim 1 wherein said drum assembly corresponds to models DVW, DNW, HDW series.

9. An indicator tool for checking the alignment of a drum assembly aswociated wish a video recording device, the drum assembly including a lower drum that is connected to base, an upper drum that is connected to the lower drum via a drum support, a spindle assembly that is rotatably coupled to the base, and an inner drum attached to the spindle assembly, the spindle assembly including a guide post and rotating about a spindle axis, the inner drum including a plurality of record/reproduce heads configured for video recording, the indicator tool comprising:
a housing;
a holding mechanism coupled to said housing, said holding mechanism including a mount that is releasably mountable to the guide post of said spindle assembly so as to enable the indicator tool to rotate about the spindle axis; and
a measuring device coupled to said housing and configured to measure the displacement of a surface of said drum assembly relative to the spindle axis, said measuring device including a probe configured to contact at least an outer peripheral surface of the upper drum or an inner peripheral surface of the drum support, the probe being biased towards the peripheral surfaces in a direction substantially perpendicular to the spindle axis, wherein deviations along the peripheral surfaces are ascertained relative to the spindle axis when the indicator tool is rotated about the spindle axis and the probe is in contact with one of the peripheral surfaces.

10. A method of checking the eccentricity of a drum assembly associated with a video recording device, said drum assembly including a drum component and a spindle component, said drum component having a surface, said spindle component rotating about a spindle axis, said method comprising:

provicing an indicator tool having a holding mechanism mountable to said spindle component and a measuring device including a probe for engaging the surface of said drum component;

mounting said indicator tool on said rotatable component of said drum assembly such that said indicator tool may rotate about said spindle axis via said spindle component; and measuring the displacement of the surface of said drum component relative to said spindle axis, said measuring including positioning said probe along the surface of said drum component and thereafter rotating said indicator tool about said spindle axis.

* * * * *